(12) United States Patent
Kley

(10) Patent No.: US 10,610,995 B2
(45) Date of Patent: Apr. 7, 2020

(54) METHOD AND APPARATUS FOR NANOLAPPING

(71) Applicant: Victor B. Kley, Berkeley, CA (US)

(72) Inventor: Victor B. Kley, Berkeley, CA (US)

( * ) Notice: Subject to any disclaimer, the term of this patent is extended or adjusted under 35 U.S.C. 154(b) by 21 days.

(21) Appl. No.: 14/918,307

(22) Filed: Oct. 20, 2015

(65) Prior Publication Data

US 2016/0325397 A1 Nov. 10, 2016
US 2017/0225290 A9 Aug. 10, 2017

Related U.S. Application Data

(63) Continuation of application No. 13/912,169, filed on Jun. 6, 2013, now abandoned, which is a continuation of application No. 12/779,879, filed on May 13, 2010, now abandoned, which is a continuation of application No. 11/894,592, filed on Aug. 20, 2007, now abandoned, which is a continuation of application No. 10/094,411, filed on Mar. 7, 2002, now abandoned.

(60) Provisional application No. 60/274,501, filed on Mar. 8, 2001, provisional application No. 60/287,677, filed on Apr. 30, 2001.

(51) Int. Cl.
*B24B 37/11* (2012.01)
*G01Q 30/04* (2010.01)
*G01Q 80/00* (2010.01)

(52) U.S. Cl.
CPC .............. *B24B 37/11* (2013.01); *G01Q 30/04* (2013.01); *G01Q 80/00* (2013.01)

(58) Field of Classification Search
CPC ..................................................... B82Y 35/00

USPC ......... 451/5, 6, 8, 9, 10, 41; 850/33, 40, 62, 850/41, 5, 58
See application file for complete search history.

(56) References Cited

U.S. PATENT DOCUMENTS

| | | |
|---|---|---|
| 3,586,865 A | 6/1971 | Baker et al. |
| 3,812,288 A | 5/1974 | Walsh et al. |
| 4,115,806 A | 9/1978 | Morton |
| 4,604,520 A | 8/1986 | Pohl |
| 4,672,559 A | 6/1987 | Jansson et al. |
| 4,673,477 A | 6/1987 | Ramalingram et al. |

(Continued)

FOREIGN PATENT DOCUMENTS

| | | |
|---|---|---|
| EP | 0325056 | 7/1989 |
| JP | 61-133065 | 6/1986 |

(Continued)

OTHER PUBLICATIONS

U.S. Appl. No. 13/912,169, filed Jun. 6, 2003—Non-final Office Action dated Apr. 20, 2015, 10 pages.

(Continued)

*Primary Examiner* — Monica S Carter
*Assistant Examiner* — Lauren M Beronja
(74) *Attorney, Agent, or Firm* — Kilpatrick Townsend & Stockton LLP

(57) ABSTRACT

A lapping system for lapping portions of a workpiece. The lapping system includes, a lap that is defined by a surface. Portions of the surface are a lapping surface. The lapping surface has a coating that enhances material removal from a workpiece in a lapping process. The lapping system further includes, a scanning probe microscope having a tip and a substrate. The scanning probe microscope controls lapping motion of the lap and workpiece.

21 Claims, 18 Drawing Sheets

(56) References Cited

U.S. PATENT DOCUMENTS

| | | |
|---|---|---|
| RE32,457 E | 7/1987 | Matey |
| 4,681,451 A | 7/1987 | Guerra et al. |
| 4,697,594 A | 10/1987 | Mayo, Jr. |
| 4,793,201 A | 12/1988 | Kanai et al. |
| 4,831,614 A | 5/1989 | Duerig |
| 4,866,986 A | 9/1989 | Cichanski |
| 4,907,195 A | 3/1990 | Kazan et al. |
| 4,924,091 A | 5/1990 | Hansma et al. |
| 4,954,704 A | 9/1990 | Elings et al. |
| 4,999,495 A | 3/1991 | Miyata et al. |
| 5,001,344 A | 3/1991 | Kato et al. |
| 5,010,249 A | 4/1991 | Nishikawa |
| 5,015,850 A | 5/1991 | Zdeblick |
| 5,018,865 A | 5/1991 | Ferrell et al. |
| 5,025,346 A | 6/1991 | Tang |
| 5,038,322 A | 8/1991 | Van Loenen |
| 5,043,577 A | 8/1991 | Pohl |
| 5,047,633 A | 9/1991 | Finlan et al. |
| 5,047,649 A | 9/1991 | Hodgson et al. |
| 5,072,116 A | 12/1991 | Kawade et al. |
| 5,081,390 A | 1/1992 | Elings et al. |
| 5,105,305 A | 4/1992 | Betzig et al. |
| 5,107,112 A | 4/1992 | Yanagisawa et al. |
| 5,108,865 A | 4/1992 | Zwaldo et al. |
| 5,118,541 A | 6/1992 | Yamamoto et al. |
| 5,138,159 A | 8/1992 | Takase et al. |
| 5,142,145 A | 8/1992 | Yasutake |
| 5,148,307 A | 9/1992 | Kopelman |
| 5,148,308 A | 9/1992 | Kopelman |
| 5,155,589 A | 10/1992 | Gere |
| 5,166,520 A | 11/1992 | Prater et al. |
| 5,187,367 A | 2/1993 | Miyazaki |
| RE34,214 E | 4/1993 | Carlsson et al. |
| 5,210,410 A | 5/1993 | Barret |
| 5,216,631 A | 6/1993 | Sliwa |
| 5,220,555 A | 6/1993 | Yanagisawa |
| 5,231,286 A | 7/1993 | Kajimura et al. |
| 5,241,527 A | 8/1993 | Eguchi |
| 5,249,077 A | 9/1993 | Laronga |
| 5,252,835 A | 10/1993 | Lieber et al. |
| 5,253,515 A | 10/1993 | Toda et al. |
| 5,254,209 A | 10/1993 | Schmidt et al. |
| 5,254,854 A | 10/1993 | Betzig |
| 5,260,824 A | 11/1993 | Okada et al. |
| 5,276,672 A | 1/1994 | Miyazaki |
| 5,278,704 A | 1/1994 | Matsuda |
| 5,283,437 A | 2/1994 | Greshner et al. |
| 5,289,044 A | 2/1994 | Okada et al. |
| 5,289,408 A | 2/1994 | Mimura |
| 5,297,130 A | 3/1994 | Tagawa |
| 5,299,184 A | 3/1994 | Yamano |
| 5,302,239 A | 4/1994 | Roe et al. |
| 5,307,311 A | 4/1994 | Sliwa |
| 5,308,974 A | 5/1994 | Elings et al. |
| 5,317,152 A | 5/1994 | Takamatsu |
| 5,317,533 A | 5/1994 | Quate |
| 5,319,961 A | 6/1994 | Matsuyama et al. |
| 5,319,977 A | 6/1994 | Quate et al. |
| 5,322,735 A | 6/1994 | Fridez et al. |
| RE34,708 E | 8/1994 | Hansma et al. |
| 5,338,932 A | 8/1994 | Theodore et al. |
| 5,343,460 A | 8/1994 | Miyazaki |
| 5,349,735 A | 9/1994 | Kawase |
| 5,353,632 A | 10/1994 | Nakagawa |
| 5,354,985 A | 10/1994 | Quate |
| 5,357,109 A | 10/1994 | Kusumoto |
| 5,357,110 A | 10/1994 | Statham |
| 5,360,977 A | 11/1994 | Onuki et al. |
| 5,362,963 A | 11/1994 | Kopelman et al. |
| 5,373,494 A | 12/1994 | Kawagishi |
| 5,383,354 A * | 1/1995 | Doris ............... B82Y 35/00 73/105 |
| 5,389,475 A | 2/1995 | Yanagisawa |
| 5,392,275 A | 2/1995 | Kawada et al. |
| 5,393,647 A | 2/1995 | Neukermans et al. |
| 5,396,483 A | 3/1995 | Matsida |
| 5,408,094 A | 4/1995 | Kajimura |
| 5,412,641 A | 5/1995 | Shinjo |
| 5,414,260 A | 5/1995 | Takimoto et al. |
| 5,414,690 A | 5/1995 | Shido et al. |
| 5,416,331 A | 5/1995 | Ichikawa et al. |
| 5,418,363 A | 5/1995 | Elings et al. |
| 5,426,631 A | 6/1995 | Miyazaki et al. |
| 5,453,970 A | 9/1995 | Rust et al. |
| 5,455,420 A | 10/1995 | Ho et al. |
| 5,461,605 A | 10/1995 | Takimoto |
| 5,461,907 A * | 10/1995 | Tench ............... G01Q 60/38 73/105 |
| 5,463,897 A | 11/1995 | Prater et al. |
| 5,471,458 A | 11/1995 | Oguchi et al. |
| 5,472,881 A | 12/1995 | Beebe et al. |
| 5,490,132 A | 2/1996 | Yagi et al. |
| 5,495,109 A | 2/1996 | Lindsay et al. |
| 5,502,306 A | 3/1996 | Meisburger et al. |
| 5,506,829 A | 4/1996 | Yagi |
| 5,510,615 A | 4/1996 | Ho et al. |
| 5,519,686 A | 5/1996 | Yanagisawa et al. |
| 5,548,117 A | 8/1996 | Nakagawa |
| 5,559,328 A | 9/1996 | Weiss et al. |
| 5,560,244 A | 10/1996 | Prater et al. |
| 5,578,745 A | 11/1996 | Bayer et al. |
| 5,583,286 A | 12/1996 | Matsuyama |
| 5,602,820 A | 2/1997 | Wickramasinghe et al. |
| 5,610,898 A | 3/1997 | Takimoto |
| 5,623,476 A | 4/1997 | Eguchi |
| 5,634,230 A | 6/1997 | Maurer |
| 5,644,512 A | 7/1997 | Chernoff et al. |
| 5,679,952 A | 10/1997 | Lutwyche et al. |
| 5,717,680 A | 2/1998 | Yamano |
| 5,721,721 A | 2/1998 | Yanagisawa |
| 5,751,683 A | 5/1998 | Kley |
| 5,756,997 A | 5/1998 | Kley |
| 5,763,879 A | 6/1998 | Zimmer et al. |
| 5,804,709 A | 9/1998 | Bougoin et al. |
| 5,821,410 A | 10/1998 | Xiang et al. |
| 5,825,670 A | 10/1998 | Chernoff et al. |
| 5,831,181 A * | 11/1998 | Majumdar ............ B82Y 10/00 73/105 |
| 5,865,978 A | 2/1999 | Cohen |
| 5,874,726 A | 2/1999 | Haydon |
| 5,883,387 A | 3/1999 | Matsuyama et al. |
| 5,922,214 A | 7/1999 | Liu et al. |
| 6,031,756 A | 2/2000 | Gimsewski et al. |
| 6,066,265 A | 5/2000 | Galvin et al. |
| 6,101,164 A | 8/2000 | Kado et al. |
| 6,138,503 A | 10/2000 | Ray |
| 6,144,028 A | 11/2000 | Kley |
| 6,173,604 B1 | 1/2001 | Xiang et al. |
| 6,199,269 B1 | 3/2001 | Greco et al. |
| 6,201,226 B1 | 3/2001 | Shimada et al. |
| 6,229,138 B1 | 5/2001 | Kley |
| 6,229,607 B1 | 5/2001 | Shirai et al. |
| 6,229,609 B1 | 5/2001 | Muramatsu et al. |
| 6,232,597 B1 | 5/2001 | Kley |
| 6,239,426 B1 | 5/2001 | Muramatsu et al. |
| 6,242,734 B1 | 6/2001 | Kley |
| 6,249,747 B1 | 6/2001 | Bennig et al. |
| 6,252,226 B1 | 6/2001 | Kley |
| 6,265,711 B1 | 7/2001 | Kley |
| 6,281,491 B1 | 8/2001 | Kley |
| 6,337,479 B1 | 1/2002 | Kley |
| 6,339,217 B1 | 1/2002 | Kley |
| 6,340,813 B1 | 1/2002 | Tominaga et al. |
| 6,353,219 B1 | 3/2002 | Kley |
| 6,369,379 B1 | 4/2002 | Kley |
| 6,396,054 B1 | 5/2002 | Kley |
| 6,507,553 B1 | 1/2003 | Kley |
| 6,515,277 B1 | 2/2003 | Kley |
| 6,517,249 B1 | 2/2003 | Doll |
| 6,573,369 B2 | 6/2003 | Henderson et al. |
| 6,614,227 B2 | 9/2003 | Ookubo |
| 6,724,712 B2 | 4/2004 | Kley |
| 6,737,331 B1 | 5/2004 | Lewis et al. |
| 6,752,008 B1 | 6/2004 | Kley |

(56) References Cited

U.S. PATENT DOCUMENTS

| | | |
|---|---|---|
| 6,787,768 B1 | 9/2004 | Kley et al. |
| 6,802,646 B1 | 10/2004 | Kley |
| 6,923,044 B1 | 8/2005 | Kley |
| 2001/0010668 A1 | 8/2001 | Kley |
| 2002/0007667 A1 | 1/2002 | Pohl et al. |
| 2002/0062572 A1 | 5/2002 | Bindell et al. |
| 2002/0117611 A1 | 8/2002 | Kley |
| 2002/0135755 A1 | 9/2002 | Kley |
| 2002/0189330 A1 | 12/2002 | Mancevski et al. |
| 2003/0012657 A1 | 1/2003 | Marr et al. |
| 2003/0027354 A1 | 2/2003 | Geli |
| 2003/0062193 A1 | 4/2003 | Thaysen et al. |
| 2003/0089182 A1 | 5/2003 | Thaysen et al. |
| 2003/0167831 A1 | 9/2003 | Kley |
| 2004/0118192 A1 | 6/2004 | Kley |

FOREIGN PATENT DOCUMENTS

| | | |
|---|---|---|
| JP | 1-262403 | 10/1989 |
| JP | 7-105580 | 4/1995 |
| WO | 96/03641 A1 | 2/1996 |
| WO | 97/04449 | 2/1997 |
| WO | 98/34092 A2 | 8/1998 |
| WO | 03/046473 | 6/2003 |
| WO | 04/023490 | 3/2004 |
| WO | 01/03157 | 1/2011 |

OTHER PUBLICATIONS

U.S. Appl. No. 12/779,879, filed May 13, 2010—Non-final Office Action dated Dec. 6, 2012, 11 pages.

U.S. Appl. No. 11/894,592, filed Aug. 20, 2007—Non-final Office Action dated Feb. 27, 2009, 15 pages.

U.S. Appl. No. 10/094,411, filed Mar. 7, 2002—Final OA dated Jun. 7, 2007, 10 pages.

Non-final Office Action for U.S. Appl. No. 10/094,411, filed Feb. 6, 2006.

Griffith et al., "Characterization of Scanning Probe Microscope Tips for Linewidth Measurement," 1991.

Cricenti et al., "Preparation and Characterization of Tungsten Tips for Scanning Tunneling Microscopy," 1994.

Nagahara et al., "Preparation and Characterization of STM Tips for Electrochemical Studies," 1989.

Jaschke et al. "Deposition of Organic Material by the Tip of a Scanning Force Microscope," Langmuir 11:1061-1064 (1995).

Ager et al., "Multilayer hard carbon films with low wear rates," *Surface and Coatings Technology*, 91:91-94 (1997).

Betzig et al "Near-Field Optics: Microscopy Spectroscopy and Surface Modification Beyond the Diffraction Limit" Science 257:(1992).

Dai et al. "Nanotubes as nanoprobes in scanning probe microscopy," Nature 384:147-150 (1996).

Davis "Deposition characterization and device development in diamond silicon carbide and gallium nitride thin films" J. Vac. Sci. Technol. A 11(4). Jul./Aug. 1993.

Diaz et al., An Improved Fabrication Technique for Porous Silicon, Rev. Sci. Instrunn.64 (2), Feb. 1993, pp. 507-509.

Givargizov et al "Growth of diamond particles on sharpened silicon tips" Materials Letters 18:(1993).

Gomyo et al. Effect of Electrochemical Treatments on the Photoluminescence from Porous Silicon, J. Electrochem. Soc., vol. 139, No. 9, Sep. 1992, pp. L86-L88.

Nossarzewska-Orlowska et al., Photoluminescence Properties of Porous Silicon Prepared by Electrochemical Etching of Si Epitaxial Layer, Acta Physica Polonica A, No. 4. vol. 84 (1993), pp. 713-716.

Rasmussen et al. "Fabrication of an All-metal Atomic Force Microscope Probe," IEEE (1997).

Rossow et al., Influence of the Formation Conditions on the Microstructure of Porous Silicon Layers Studied by Spectroscopic Ellipsometry, Thin Solid Films, 255 (1995), pp. 5-8.

Smestad et al., Photovoltaic Response in Electrochemically Prepared Photoluminescent Porous Silicon, Solar Energy Materials and Solar Cells, 26 (1992), pp. 277-283.

Tang "Electrostatic comb drive for resonant sensor and actuator applications," Abstract of dissertation at the University of California at Berkeley (1990).

Toledo-Crow et al "Near-field differential scanning optical microscope with atomic force regulation" Appl. Phys. Lett. 60: (1992).

Van Hulst et al "Near-field optical microscope using a silicon-nitride probe" Appl. Phys. Lett. 62: (1993).

Watson et al "The Radiation Patterns of Dielectric Rods—Experiment Theory" Journal of Applied Physics 19: (1948).

\* cited by examiner

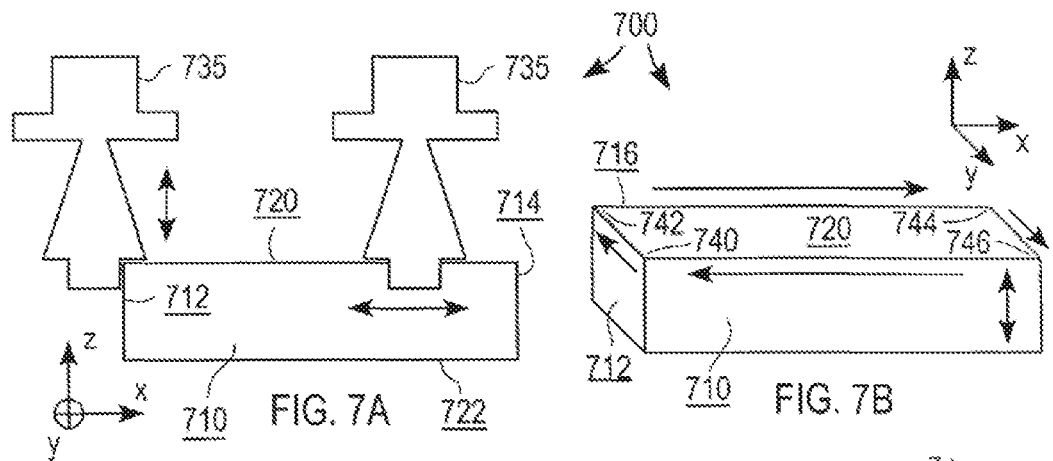
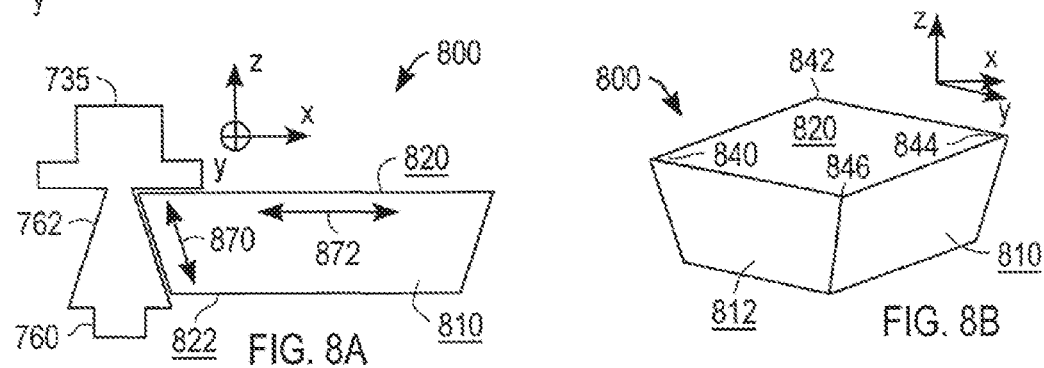
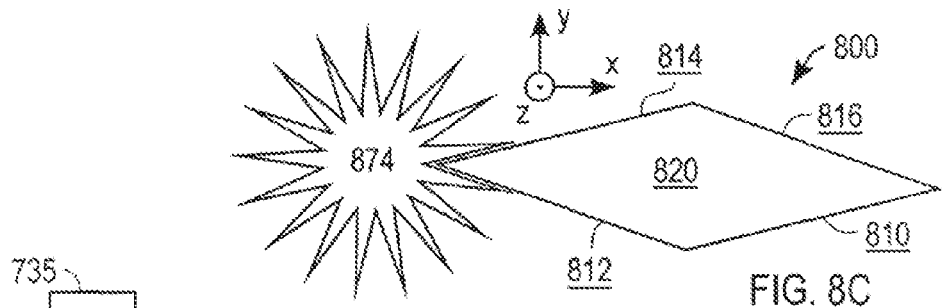
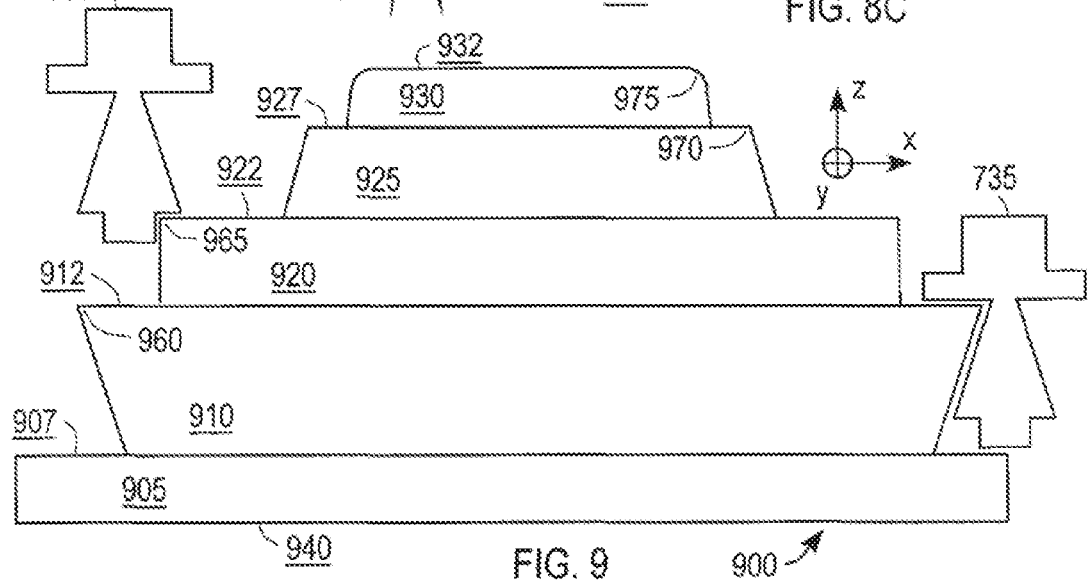

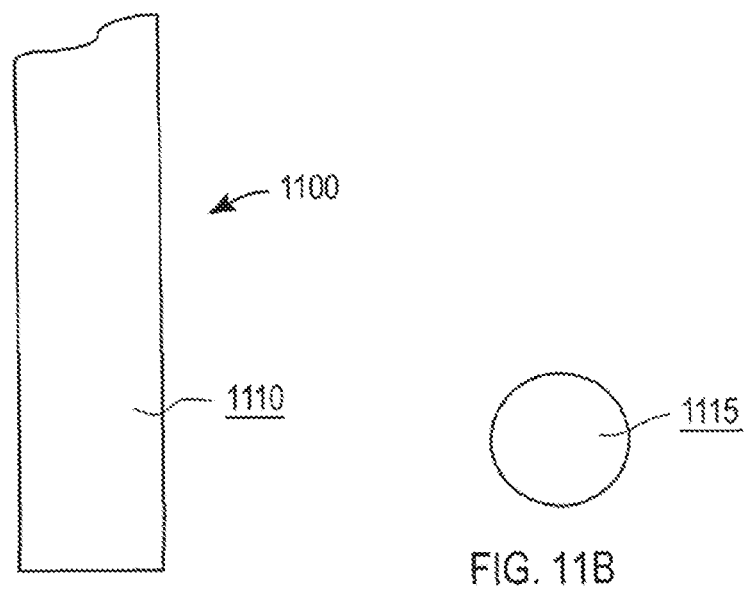
FIG. 11A
FIG. 11B
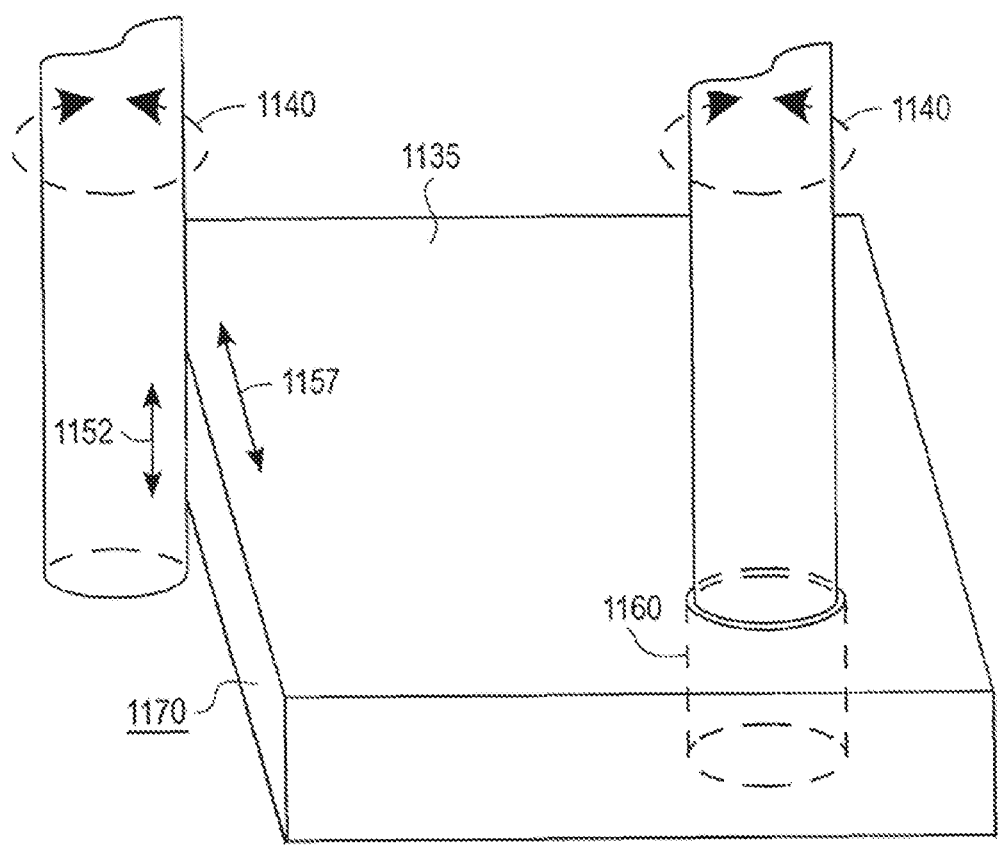
FIG. 11C

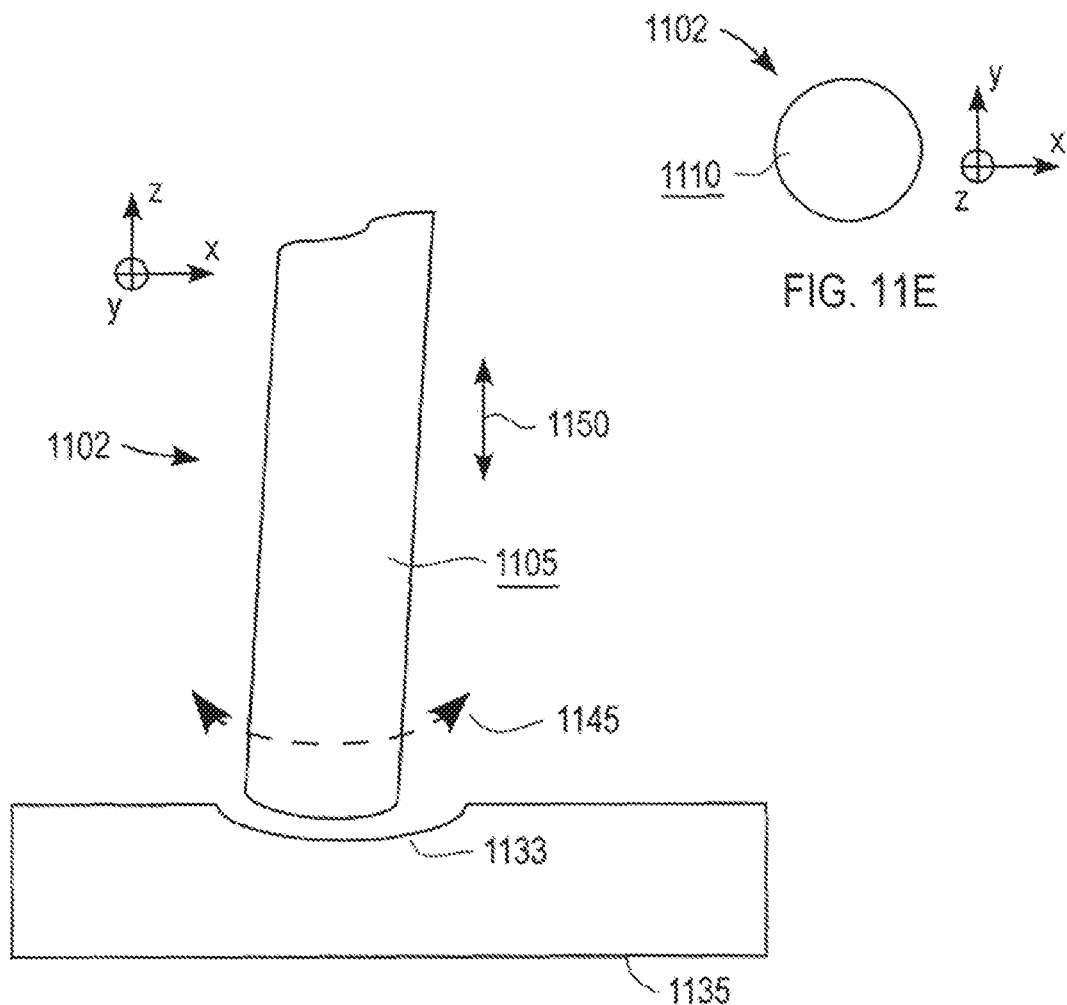

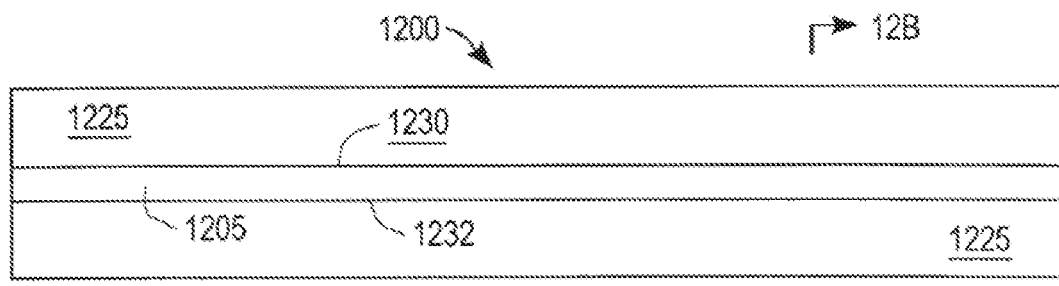
FIG. 12A
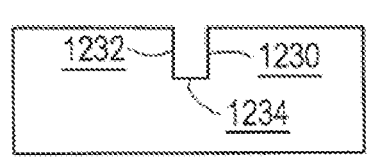
FIG. 12B
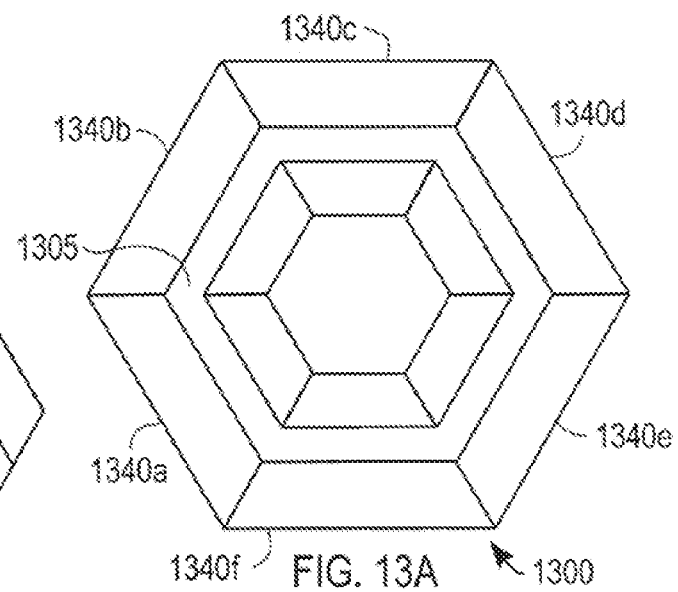
FIG. 13D
FIG. 13A
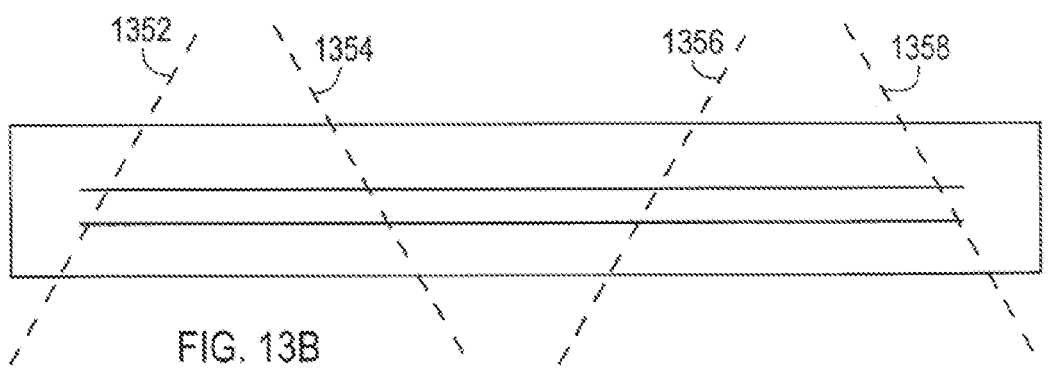
FIG. 13B
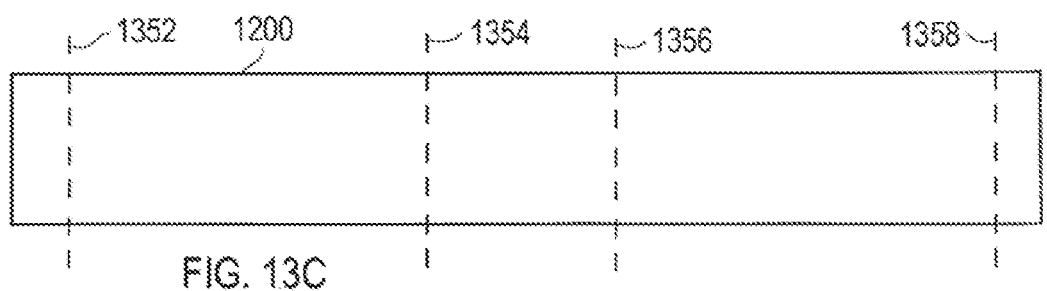
FIG. 13C

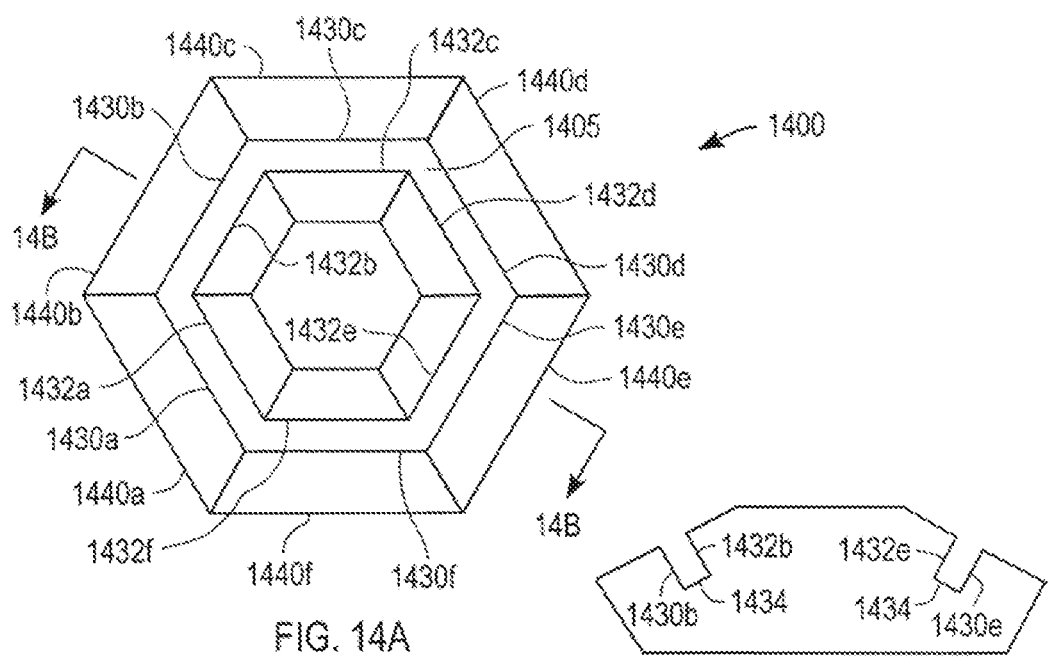
FIG. 14A
FIG. 14B
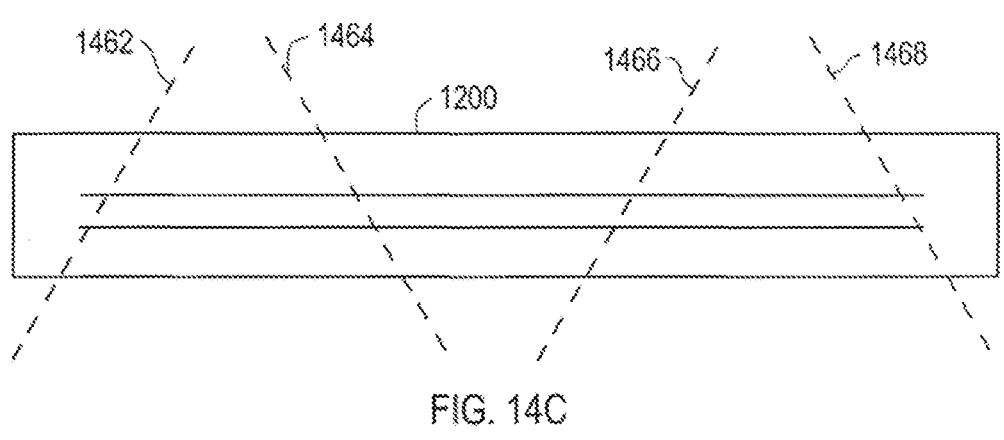
FIG. 14C
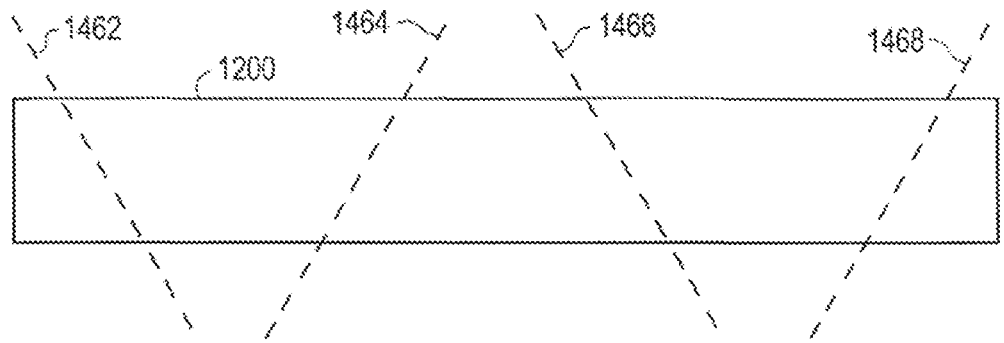
FIG. 14D

METHOD AND APPARATUS FOR NANOLAPPING

CROSS-REFERENCES TO RELATED APPLICATIONS

This application is a continuation of U.S. patent application Ser. No. 13/912,169, filed Jun. 6, 2013, abandoned,
which is a continuation of U.S. patent application Ser. No. 12/779,879, filed May 13, 2010, abandoned,
which is a continuation of U.S. patent application Ser. No. 11/894,592, filed Aug. 20, 2007, abandoned,
which is a continuation of U.S. patent application Ser. No. 10/094,411, filed Mar. 7, 2002, abandoned,
which claims priority from the following provisional applications:
- U.S. Application No. 60/274,501, filed Mar. 8, 2001 by Victor B. Kley for "Scanning Probe Microscopy and Nanomachining;" and
- U.S. Application No. 60/287,677, filed Apr. 30, 2001 by Victor B. Kley for "Scanning Probe Microscopy and Nanomachining."

The disclosures of the above referenced applications are incorporated by reference in their entirety for all purposes.

The following five U.S. patent applications were filed concurrently with U.S. patent application Ser. No. 10/094,411 and their disclosures are incorporated by reference in their entirety for all purposes:
- U.S. patent application Ser. No. 10/094,148, filed Mar. 7, 2002 by Victor B. Kley for "Method and Apparatus for Scanning in Scanning Probe Microscopy and Presenting Results" now U.S. Pat. No. 6,752,008;
- U.S. patent application Ser. No. 10/093,842, filed Mar. 7, 2002 by Victor B. Kley for "Nanomachining Method and Apparatus," now U.S. Pat. No. 7,196,328;
- U.S. patent application Ser. No. 10/094,408, filed Mar. 7, 2002 by Victor B. Kley for "Active Cantilever for Nanomachining and Metrology," now U.S. Pat. No. 6,923,044;
- U.S. patent application Ser. No. 10/094,149, filed Mar. 7, 2002 by Victor B. Kley for "Low Friction Moving Interfaces in Micromachines and Nanomachines," now U.S. Pat. No. 6,802,646; and
- U.S. patent application Ser. No. 10/093,947, filed Mar. 7, 2002 by Victor B. Kley and Robert T. LoBianco for "Method and Apparatus for Tool and Tip Design for Nanomachining and Measurement," now U.S. Pat. No. 6,787,768.

The disclosures of the following U.S. patents are incorporated by reference in their entirety for all purposes:
- U.S. Pat. No. 6,144,028, issued Nov. 7, 2000 to Victor B. Kley for "Scanning Probe Microscope Assembly and Method for Making Confocal, Spectrophotometric, Near-Field, and Scanning Probe Measurements and Associated Images";
- U.S. Pat. No. 6,252,226, issued Jun. 26, 2001 to Victor B. Kley for "Nanometer Scale Data Storage Device and Associated Positioning System"; and
- U.S. Pat. No. 6,339,217, issued Jan. 15, 2002 to Victor B. Kley for "Scanning Probe Microscope Assembly and Method for Making Confocal, Spectrophotometric, Near-Field, and Scanning Probe Measurements and Associated Images."

The disclosure of the following published PCT application is incorporated by reference in its entirety for all purposes:
- WO 01/03157 (International Publication Date: Jan. 11, 2001) based on PCT Application No. PCT/US00/18041, filed Jun. 30, 2000 by Victor B. Kley for "Object Inspection and/or Modification System and Method."

BACKGROUND OF THE INVENTION

The present invention relates to the production of objects via abrasive and/or chemical processes and more specifically relates to the production of objects of a fine scale having a high degree of refinement and accuracy using abrasive and/or chemical laps.

Lapping is a process in which two objects in contact are moved relative to one another such that the surface of one or both is altered. A lapping process may include, for example, in the production of a chair, the legs of the chair being shaped from a piece of stock by a lap. A typical lap used for such a process is sandpaper. Sandpaper typically has an abrasive material (such as small bits of garnet crystal, ruby crystal, or aluminum oxide) glued to its surface. To give shape to the stock and thereby turn it into the desired chair leg, the lap is vigorously rubbed across the surface of the stock thereby removing bits of the stock and giving shape to the leg.

Other examples of lapping processes include the sharpening of a knife blade with a lap. A typical lap used for such a process is a whetstone. A whetstone is a natural or man-made stone having an abrasive surface. The stone may have oil or water placed upon its surface to encourage the formation of a slurry as the knife blade is rubbed across the surface of the stone. The stone's abrasive surface and the slurry remove bits of metal from the knife blade as it is rubbed across the surface of the stone. If the knife and stone are held a an appropriate angle as the knife is rubbed against the stone, the knife will become sharpened.

The above described lapping processes work well in the macroscopic realm. One may simply pick up a lap with one's hands and give shape to an object with the lap. However, in the microscopic realm, picking up a lap and giving shape to an object with the lap is not as simple as taking a piece of sandpaper in hand to lap a chair leg or using a whetstone lap a knife blade. Accordingly, new lapping techniques and apparatus are desired to shape objects in the microscopic realm.

A further understanding of the nature and advantages of the present invention may be realized by reference to the remaining portions of the specification and the drawings.

BRIEF SUMMARY OF THE INVENTION

In accordance with the invention nanolapping methods and apparatus include components for lapping shapes in portions of a workpiece. In one aspect of the embodiments of the invention a scanning probe microscope controls the relative lapping motion of a lap and workpiece. In another aspect of the invention, laps are fabricated from silicon wafers cut along the 100 crystallographic plane. In another aspect of the invention, laps are fabricated from silicon wafers cut along the 110 crystallographic plane. In still another aspect of the invention, laps are coated with abrasive or chemical reagents to enhance material removal from a workpiece in a lapping process. In still yet another aspect of embodiments of the invention, scanning techniques are provided to produce scan data relating to a scanning tip.

A further understanding of the nature and advantages of the present invention may be realized by reference to the remaining portions of the specification and the drawings.

BRIEF DESCRIPTION OF THE DRAWINGS

FIGS. 7A and 7B are schematic side and perspective views, respectively, of a lap according to an embodiment of the invention;

FIGS. 8A, 8B, and 8C are schematic side, perspective, and top views, respectively, of a lap according to another embodiment of the present invention;

FIG. 9 is a side view of a lap according to another embodiment of the present invention;

FIGS. 11A, 11B, and 11C are schematic side, bottom, and perspective views, respectively, of a lap according to an embodiment of the present invention;

FIGS. 11D and 11E are schematic side and bottom views, respectively, of a lap according to another embodiment of the present invention;

FIGS. 12A and 12B are schematic top and cross-sectional views, respectively, of a lap made from a silicon wafer cut along the 110 plane according to an embodiment of the present invention;

FIG. 13A is a schematic top view of a lap having a hexagonal track according to an embodiment of the present invention;

FIGS. 13B and 13C are a schematic top and side views of a lap indicating locations at which the lap may be cut to form lap segments that are arranged to form other laps;

FIG. 13D is a schematic top view of a lap segment;

FIGS. 14A and 14B are schematic top and cross-sectional views of a lap having a hexagonal track according to an embodiment of the present invention;

FIGS. 14C and 14D are a schematic top and side views of a lap indicating locations at which the lap may be cut to form lap segments that are arranged to form other laps;

DETAILED DESCRIPTION OF THE INVENTION

Introduction

Figure 1A:
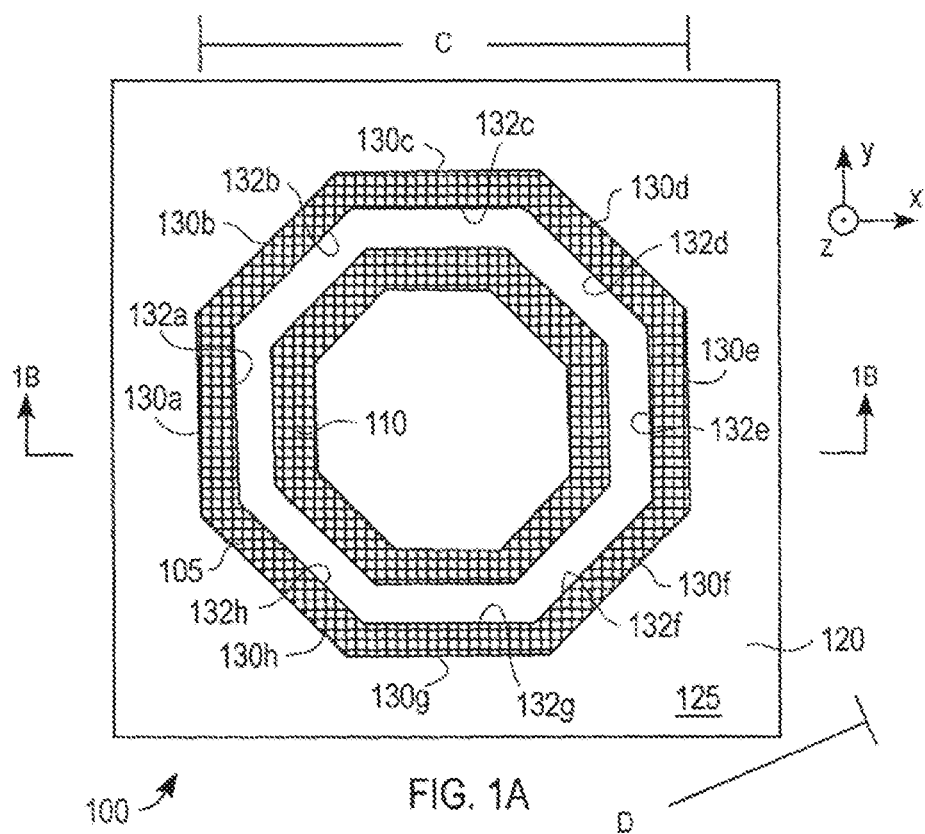
FIG. 1A are 1B are schematic top and cross-sectional views of a lap according to an embodiment of the present invention.

The following description sets forth lapping apparatus and lapping methods according to embodiments of the invention. Embodiments of the invention are used as either a tip or substrate in a scanning probe microscope (SPM) to lap and thereby give shape to portions of a workpiece.

The general functionality of the present invention is to produce objects via abrasive and/or chemical operations and more specifically to produce objects via abrasive and/or chemical nanolapping. Most of the discussion will be with reference to lap embodiments having a body with a surface, some or all portions of the surface being a lapping surface. Alternatively, a body may have surface portions providing multiple lapping surfaces. A lapping surface, as referred to herein, is a contiguous set of surface portions used to lap a workpiece. A lap body, also referred to simply as a lap, may have surface portions that are polygonal, curved, or combinations thereof. Further, the body may have surface portions that protrude from or recessed into other surface portions. Protruding and recessed surface portions may have further surface portions, some or all of which are a lapping surface.

Surface portions of a body that form a lapping surface may be relatively small. For example, the maximum lateral expanse of a lapping surface along any given axis may be about 200 μm or less. Further, the volume defined by a three-dimensional lapping surface will typically fit within a cubical space having dimensions of about 200 µm on a side or less. However, according to other embodiments, a lapping surface may be relatively large, for example, the maximum lateral expanse of a lapping surface along any given axis may be more than 200 µm, for example, 1 mm or more. A body having a lapping surface is used in combination with a device having relatively fine position control (e.g., a scanning probe microscope), to provide very refined nano-lapping of a workpiece, (e.g., atomic level precision). Workpieces are also referred to as "target objects," and "tools." A typical scanning probe microscope provides for control of motion from the nanometer range down to the angstrom level and below. Such fine control of motion provides for very fine detail (e.g., atomic level detail) to be nanolapped onto a workpiece. Whether a lap is relatively large, for example, larger than a few millimeters, or relatively small, for example, smaller than 5 µm, workpieces of these scales may be nanolapped with the aforementioned levels of precision.

Scanning probe microscopy (SPM) has been put to successful use in the imaging of objects not otherwise resolvable by classical optics techniques. Various SPM techniques, such as scanning electron microscopy, scanning tunneling microscopy, and atomic force microscopy have provided images down to the atomic level. Further, SPM techniques have been used with some success in manipulating objects at the atomic level. For example, individual atoms of iron have been moved about on a substrate to create letters that are tens of angstroms in height and width. While creating letters and spelling out words in iron atoms is of limited practicality, such atomic level manipulations provide an impetus to create useful devices using SPM techniques.

Of greater utility than the creation of atomic scale letters, is, for example, the creation of microscopic machines and tools. For example, the creation of tools and machines having dimensions of say, less than or equal to about 200 µm along any given axis, provide utility where other larger devices fail. For example, microscopic mechanical memories may be of use in environments, such as space, in which semiconductor based devices have high fault rates due to high-energy cosmic radiation. Further, microscopic mechanical machines may be of surgical use, reaching areas of the body not otherwise accessible or manipulable by traditional surgical tools and techniques. Methods and apparatus of the present invention are directed toward such problems as well as others and are described in detail below.

Embodiments with Polygonal and Curved Tracks

Figure 1B:
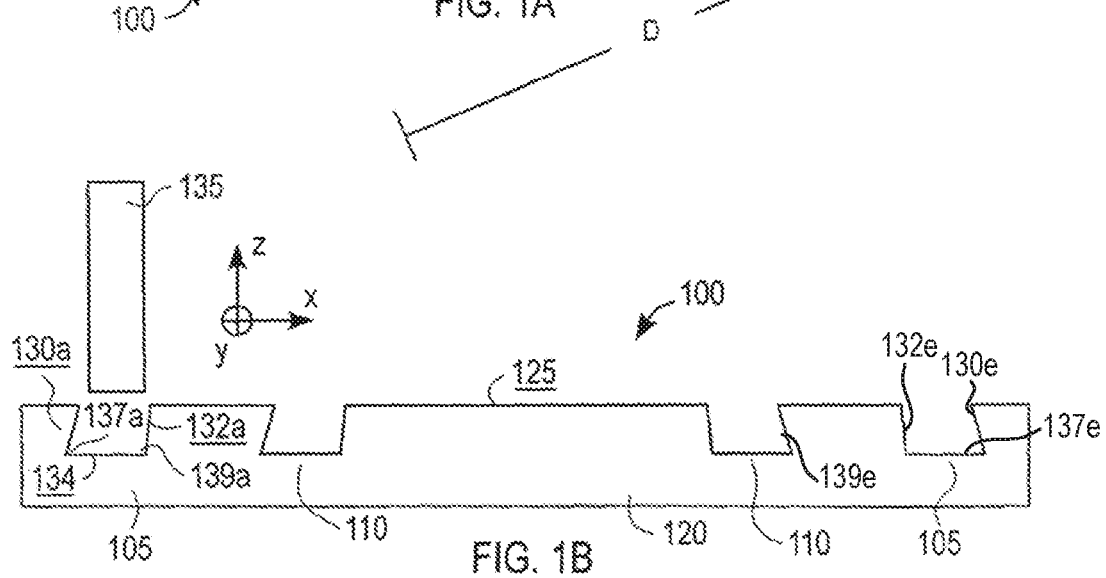
FIG. 1C is a schematic cross-sectional view of a lap according to an embodiment of the present invention.

FIGS. 1A and 1B are schematic top and side views of a lap 100 according to a specific embodiment of the present invention. Lap 100 is formed from a substrate 120 having various contours formed therein. Lap 100 has a surface with octagonal tracks 105 and 110 formed as recesses in the surface below an upper surface 125. Surface portions forming tracks 105 and 110 are variously identified. Each track has eight segments, and certain features will be denoted with a base reference numeral and an alphabetic suffix "a-h" denoting the segment. Each of the tracks is shown as having two sidewalls (denoted with base reference numerals 130 and 132) and a bottom surface 134. Thus outer sidewall 130 includes sidewall segments 130a-130h, with segments 130a and 130e shown in FIG. 1B. Similarly, inner sidewall 132 has sidewall segments 132a-132h, with segments 132a and 132e shown in FIG. 1B.

For consistency and clarity, a particular coordinate system will be shown and referred to. FIG. 1A is considered to lie in the x-y plane, and the z-axis will be considered to extend out of the page. In accordance with standard symbology, an axis extending out of the page will be denoted by a dot in a circle while an axis extending into the page will be denoted by a + in a circle. The top view of FIG. 1A thus shows lap 100 extending laterally in the x-y plane, and the cross-sectional view (FIG. 1B) taken along line 1B-1B of FIG. 1A extends in the x-z plane. In most instances, references to direction and orientation that mention an axis (e.g., the x-axis) or a plane (e.g., the x-y plane) should be considered to include lines parallel to that axis, or planes parallel to that plane.

The lapping surface of lap 100 may variously include, one or more of tracks 105, 110, and all or portions of surface 125. Typically, the dimensions of a lapping surface is set according to a particular lapping to be achieved. For example, the height of sidewall segments 130a-130h and 132a-132h (measured between top surface 125 and bottom surface 134) are equal to about 200 µm or less. In accordance with various embodiments of the invention, the height of the sidewall segments may be on the order of about 100 µm or less, about 75 µm or less, about 60 µm or less, about 50 µm or less, or about 10 µm or less. According to other embodiments of the present invention, the height of the sidewalls is about 1 µm to 2 µm and the width of bottom surface is about 2 µm to 4 µm. However, according to other embodiment, a lapping surface may be relatively large, for example, the height of the sidewall segments may be greater than 200 µm, for example, 1 mm or more.

To achieve a lapping result, a workpiece is shaped by nanolapping, (i.e., rubbing the workpiece against the lapping surface of the lap). As the workpiece is rubbed against the lapping surface of the lap, material is removed from the workpiece. The removal of material from the workpiece imparts the contour of a lapping surface to the workpiece. For example, a workpiece 135 may first be rubbed against outer sidewalls 130a, giving shape to one side of the workpiece and then the workpiece may be rubbed against inner sidewall 132a, giving shape to another side of the workpiece. A workpiece may also be rubbed against bottom surface 134 to give shape to the bottom of the workpiece.

Typically, the angles between the sidewalls and the bottom surface are also set according to a particular lapping to be achieved. The angles between the outer sidewalls 130a-130h and the bottom surface are approximately equal as are the angles between the inner sidewalls 132a-132h and the bottom surface. Each of the angles may be in the range of less than 180° to less than 1°. According to a specific embodiment, the angles between the outer sidewalls and the bottom surface are about 70° and the angles between the inner sidewalls and the bottom surface are about 93°. FIG. 1B shows a cross-sectional view of lap 100 revealing four of these angles designated 137a, 139a, 139e, and 137e. According to the specific embodiment, angles 137a and 137e are each about 93° and angles 139a and 139e are each about 70°. Other cross-sectional views of trenches 105 and 110 would reveal similar angular relationships for the other outer and inner sidewalls and the bottom surface.

Figure 1C:
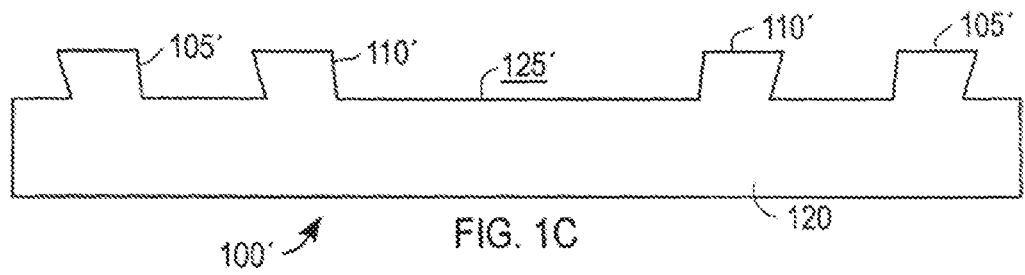

The tracks 105 and 110 are shown as recessed below top surface 125. Other track configurations of the present invention protrude from the surface of the substrate. For example, FIG. 1C shows a cross-sectional view of an octagonal lap 100' having tracks 105' and 110' with surface portions protuberating above a top surface 125' of a substrate 120. A top view of lap 100' is essentially the same as that shown in FIG. 1A. Similar to lap 100, the lapping surface of lap 100' may include, for example, the surface portions of tracks 105' and 110' and possibly all or portions of top surface 125'.

Figure 2A:
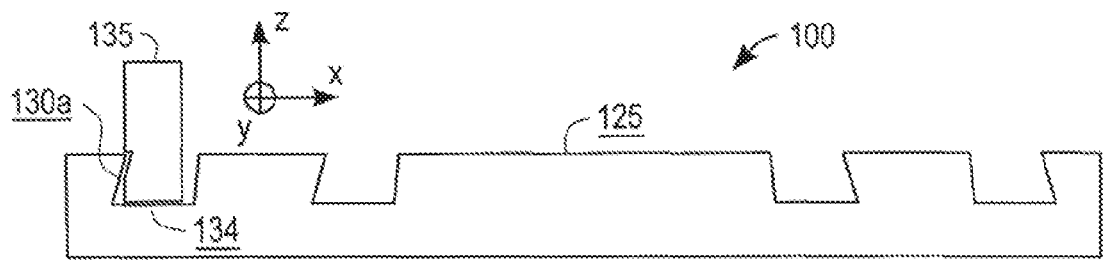
FIGS. 2A, 2B, and 2C show an example of a nanolapping process according to an embodiment of the invention.
Figure 2B:
Figure 2C:
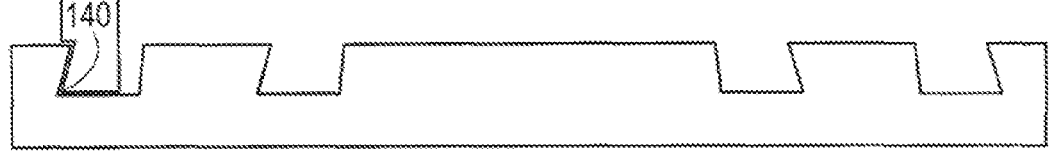

FIGS. 2A, 2B, and 2C show an example of a time-ordered sequence of a lapping process according to an embodiment of the invention. Workpiece 135 lapped against lap 100 is shown at various steps of a lapping process. The direction of rubbing is perpendicular to the plane of the page, i.e., along the y-axis. As the workpiece is successively rubbed in a side-to-side motion against outer sidewall 130a, bottom surface 134, and top surface 125, the shape of the workpiece is altered. Workpiece 135 is shown to assume the contour of the surface portions as the workpiece is rubbed. For example, if angle 137a between outer sidewall 130a and bottom surface 134 is 70°, then the interior angle 140 of workpiece 135 will also be 70°.

Figure 2D:
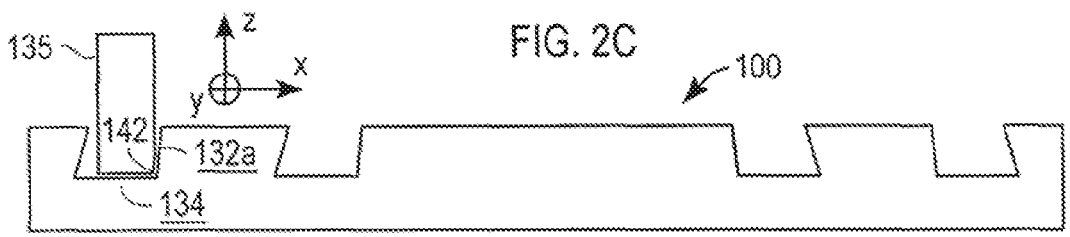
FIGS. 2D, 2E, and 2F show another example of a nanolapping process according to another embodiment of the present invention.
Figure 2E:
Figure 2F:
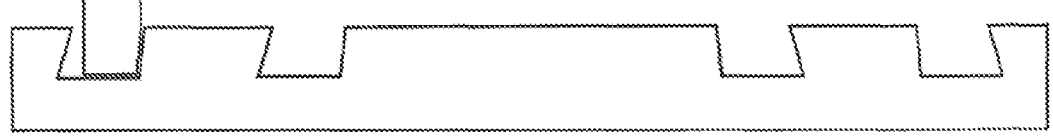

FIGS. 2D, 2E, and 2F show another example of a time-ordered sequence of a lapping process according to an embodiment of the invention. Similar to the example shown in FIGS. 2A-2C, FIGS. 2D-2F show various steps of a lapping process as the steps may appear at various points of time. Workpiece 135 is rubbed in a side-to-side motion along sidewalls segment 132a and bottom surface 134. The workpiece assumes the contour of the surface portions as is it lapped. For example, if angle 139a between edges 132a and 134 is 93°, then interior angle 142 of the workpiece will be 93°.

Figure 2G:
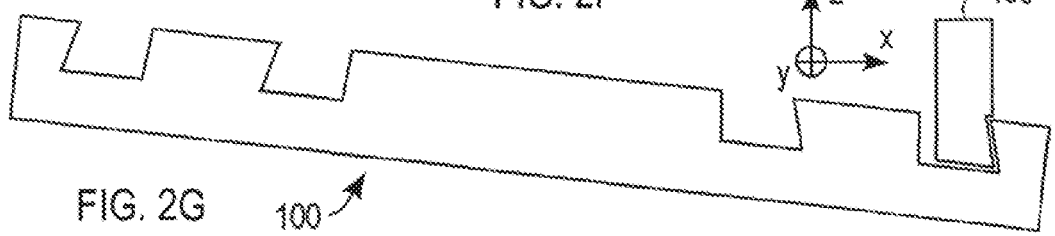
FIG. 2G shows a lap and a workpiece at an angular position other than perpendicular.

FIGS. 2A-2F show lap 100 positioned approximately perpendicular to workpiece 135. However, according to embodiments of the present invention, laps and workpieces may be set at a variety of angles with respect to each other. For example, FIG. 2G shows lap 100 and a workpiece 135 at an angular position other than perpendicular. Either the lap or the workpiece may be rotated to achieve this position. As laps and workpieces may be set at a variety of angles with respect to each other, a single lap may be used to impart a further variety of profiles onto a workpiece other than that achieved for relatively perpendicular positioning.

Figure 3A:
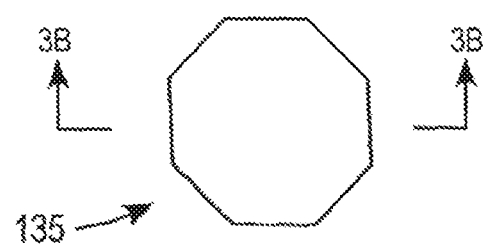
FIG. 3A is a bottom view of a workpiece having an octagonal shape.
Figure 3B:
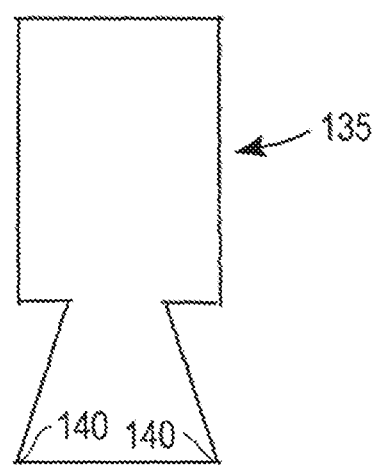
FIG. 3B is a side view of the workpiece.

As described above, the lapping direction shown in each of FIGS. 2A-2G is along a y-axis of the lap. However, according to the present invention, nanolapping is not limited to one axis of a lap. Nanolapping may be along each of the x, y, and z-axes or along combinations thereof. For example, referring again to FIG. 1A, workpiece 135 may be lapped against each of sidewall segments 130a-h and top surface 125. As workpiece 135 is lapped against sidewall segments 130a-h and top surface 125, the workpiece will assume not only the angular profile shown in FIGS. 2A-2C, but also the octagonal shape of track 105. FIG. 3A is a bottom view of workpiece 135 having an octagonal shape assumed by the workpiece after being lapped against each of sidewall segments 130a-h. FIG. 3B is a cross-sectional view of workpiece 135 taken through line 3B-3B of FIG. 3A. Each of the eight bottom edges of the workpiece will have interior angles 140 (two of which are shown in FIG. 3B) that correspond to the angles between sidewall segments 130a-h and bottom surface 134.

Figure 4A:
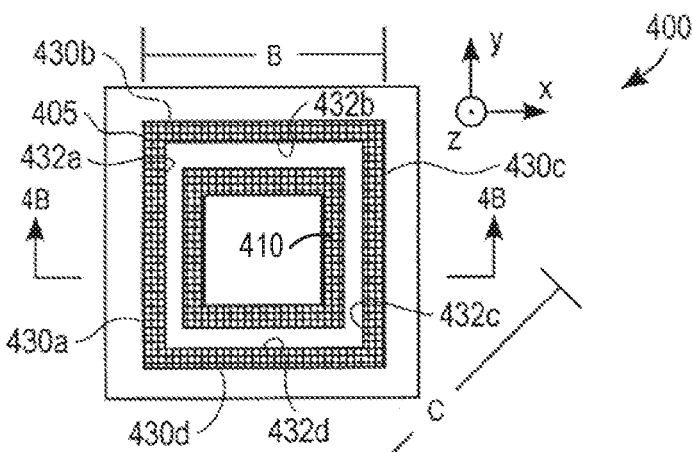
FIGS. 4A and 4B are schematic top and cross-sectional views of lap according to an embodiment of the present invention.
Figure 4B:
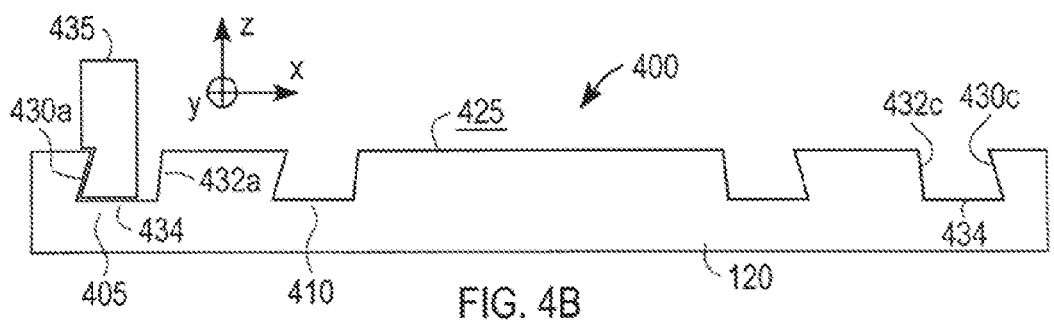

FIGS. 4A and 4B are schematic top and cross-sectional views, respectively, of a lap 400 according to another embodiment of the present invention. A similar reference numeral scheme will be used as that of FIGS. 1A-1C. This embodiment differs from the embodiment of FIGS. 1A-1C in that it has square tracks 405 and 410 recessed in a substrate 120 having a top surface 425.

Each track has an outer sidewall 430 and an inner sidewall 432. Each sidewall has four segments that include sidewall segments 430a-430d and sidewall segments 432a-432d. The cross-sectional view shown in FIG. 4B taken along line 4B-4B show sidewall segments 430a and 430c and sidewall segments 432a and 432c. The lapping surface may include, for example, the sidewalls and bottom surfaces or the sidewalls and bottom surfaces and all or portions of top surface 425.

Lap 400 has similar dimensions as that of lap 100. For example, the height of sidewall segments 430a-430d and 432a-432d (measured between top surface 425 and bottom surface 434) may be equal to about 200 µm or less. In accordance with various embodiments of the invention, the height of the sidewall segments may be on the order of about 100 µm or less, about 75 µm or less, about 60 µm or less, about 50 µm or less, or about 10 µm or less. According to other embodiments of the present invention, the height of the sidewalls is about 1 µm to 2 µm and the width of bottom surface is about 2 µm to 4 µm. Alternatively, the height of the sidewall segments may be greater than about 200 µm to provide nanolapping for relatively larger workpieces. Additionally, the angles between sidewall segments 430a-430b and bottom surface 434 and the angles between sidewall segments 432a-432d and bottom surface 434 may range from less than 180° to less than 1°. According to a specific embodiment, angles between sidewall segments 430a-430d and bottom surface 434 are each about 70° and angles between sidewall segments 432a-432d and bottom surface 434 are each about 93°.

Figure 4C:
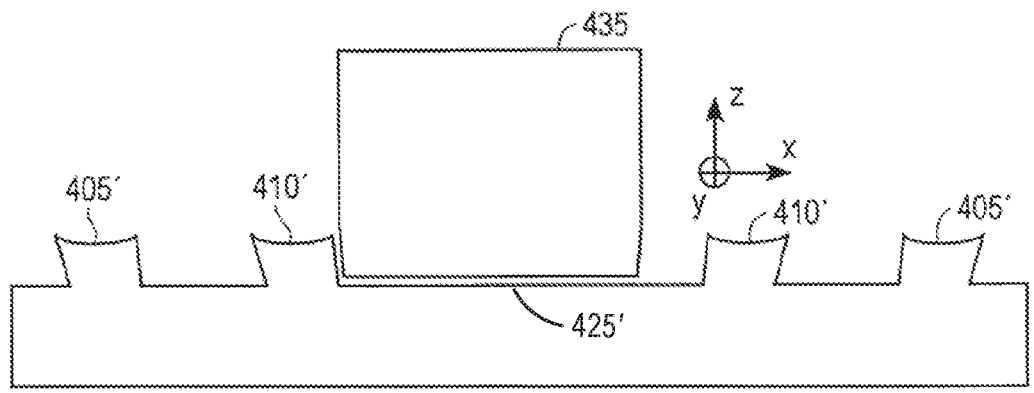
FIG. 4C is a schematic cross-sectional view of a square lap having tracks protruding above a top surface of a substrate according to an embodiment of the present invention.

Tracks 405 and 410 are shown as recessed below top surface 425. Other track configurations of the present invention protrude from the surface of the substrate. For example, FIG. 4C is a schematic cross-sectional view of a square lap 400' having tracks 405' and 410' with surface portions protruding above a top surface 425' of a substrate 120. A top view of lap 400' is essentially the same as that shown in FIG. 4A. Similar to lap 100, the lapping surface of lap 400' may include, for example, the surface portions of tracks 405' and 410' and possibly all or portions of top surface 425'.

Figure 4D:
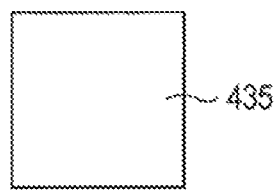
FIG. 4D shows a bottom view of a workpiece having a square profile adopted by the workpiece subsequent to nanolapping along the tracks of the lap of FIG. 4A or 4B.

According to methods of the present invention, laps 400 and 400' are used to produce workpieces having angled shapes such as square or rectangular shapes. For example, rubbing a workpiece 435 along sidewall segments 430a-430d will produce a workpiece having a square or rectangular profile as viewed from the bottom of the workpiece. A square profile is typically achieved by nanolapping a workpiece an equal number of times against each of the sidewall segments. FIG. 4D shows a bottom view of a workpiece 435 having a square profile adopted by the workpiece subsequent to nanolapping along the tracks of lap 400 or 400'. A rectangular shaped workpiece can be formed typically by nanolapping the workpiece, for example, along sidewall segment 430a and 430c more than along sidewall segment 430b and 430d. However, some workpieces shaped by nanolapping may have nonuniform hardness. In other words, the hardness of the workpiece varies along different axes the workpiece. Accordingly, to lap a workpiece into a square profile, more rubbing is performed along relatively harder sides than along relatively softer sides. For example, diamond has hardnesses that vary substantially along different crystal axes. Given surface portions of diamond are as much as 10-100 times harder than other crystal surface portions. Accordingly, nanolapping a diamond workpiece into a square may require 10-100 more lapping strokes along some surface portions than along other surface portions.

According to another method of the present invention, a lap is used to locate the relatively harder and softer sides of a workpiece. According to the method, a workpiece having a known shape is rubbed against a lapping surface. The known shape is compared to the shape of the workpiece after having been lapped. The sides of the workpiece exhibiting the greatest amount of material removal (i.e., wear) are the relatively softer sides. The sides of the workpiece exhibiting the least amount of material removal are the relatively harder sides. For example, a 100 cut diamond workpiece has four or eight hard directions depending on the orientation of the diamond. The 100 cut diamond workpiece having a known shape is rubbed against a lapping surface and compared to the known shape of the prelapped diamond workpiece. The four or eight hard sides of the diamond are then identified as those exhibiting the least amount of material removal while the softer sides of the diamond workpiece are identified as those sides exhibiting the most amount of material removal.

Figure 5A:
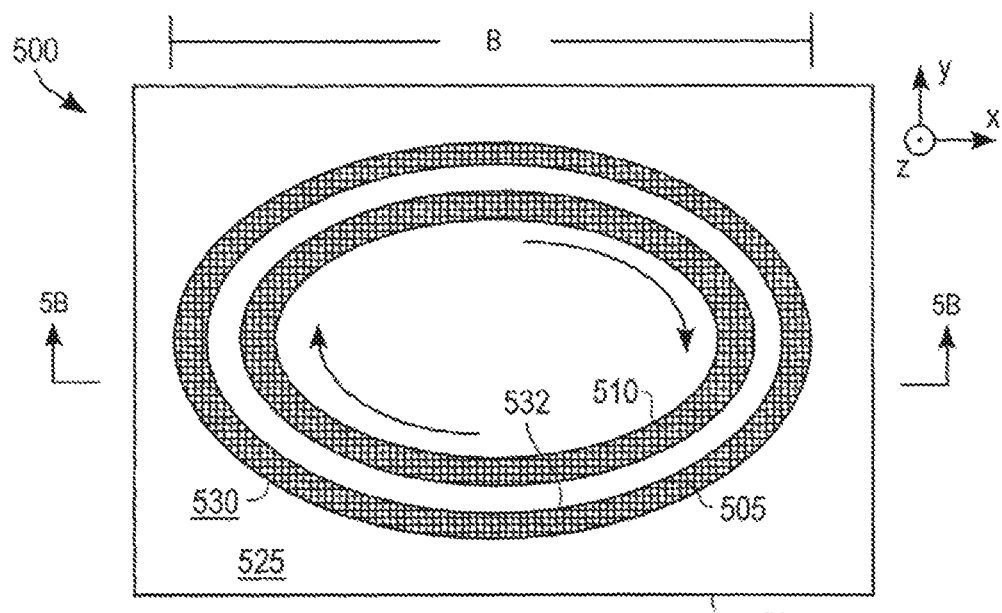
FIGS. 5A and 5B are schematic top and cross-sectional views of a lap having tracks of elliptical shape according to an embodiment of the present invention.
Figure 5B:
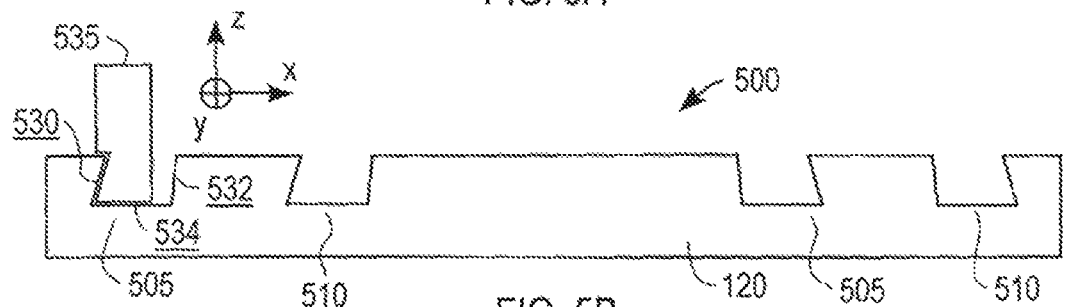

FIGS. 5A and 5B are schematic top and cross-sectional views, respectively, of a lap 500 according to another embodiment of the present invention. This embodiment differs from the embodiment of FIGS. 1A-1C in that it has elliptical tracks 505 and 510 recessed in a substrate 120 having an upper surface 525. This embodiment is one example of laps having generally curved shaped lapping surface.

Similar to laps shown in FIGS. 1B and 2B, the tracks of lap 500 are recessed below top surface 525 of substrate 120. Unlike the laps shown in FIGS. 1A and 2A, each track has a single segment that includes a single outer sidewall and a single inner sidewall in addition to a bottom surface. For example, track 505 has a single outer sidewall denoted 530, a single inner sidewall denoted 532, and a bottom surface 534. Lap 500 has similar dimensions to those of lap 100. FIG. 5B shows outer sidewall 530 and inner sidewall 532 in a cross-sectional view taken along line 5B-5B of FIG. 5A.

Figure 5C:
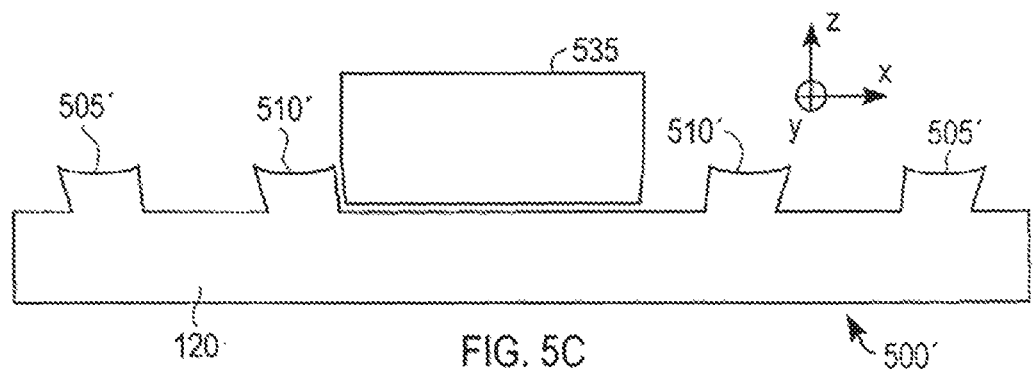
FIG. 5C is a schematic cross-sectional view of a lap according to an embodiment of the present invention.

Tracks 505 and 510 are shown as recessed below top surface 525. Other track configurations of the present invention protrude from the surface of the substrate. For example, FIG. 5C shows a cross-sectional view of an elliptical lap 500' having tracks 505' and 510' with surface portions protuberating above a top surface 525' of a substrate 120. A top view of lap 500' is essentially the same as that shown in FIG. 5A. Similar to lap 100, the lapping surface of lap 500' may include, for example, surface portion of tracks 505' and 510' and possibly all or portions of top surface 525'.

Figure 5D:
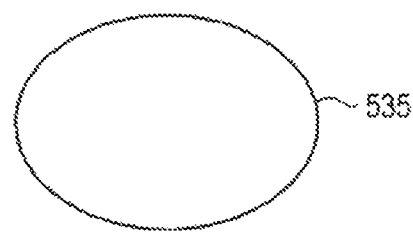
FIG. 5D is a schematic bottom view of a workpiece having an elliptical profile.

According to methods of the present invention, laps 500 and 500' are used to produce workpieces having curved shapes such as elliptical shapes or other round shapes. For example, rubbing a workpiece 535 along outer sidewall 530 will produce a workpiece having an elliptical profile as viewed from the bottom of the workpiece. FIG. 5D shows a bottom of view of a workpiece 535 having an elliptical profile adopted by the workpiece subsequent to nanolapping along one of the tracks of lap 500 or 500'.

The lap embodiments described above are shown as having tracks having octagonal, square, and elliptical shapes. However, according to other embodiments of the present invention, a lap may have tracks of generally arbitrary shapes, including other polygonal shape (e.g., heptagonal) or curved shape (e.g., circular). Alternatively, a lap may have a combination of straight and curved sections. For example, a track may be generally square, such as lap 400, however the corners of the lap may be rounded.

Laps 100, 400, and 500 (FIGS. 1, 4, and 5) each have two tracks. Laps according to the present invention may have laps with fewer or more than two tracks. For example, lap 100 instead of having two octagonal tracks 105 and 110, may have six, seven, or more tracks. Laps having numerous tracks provide for greater lap wear. For example, if one track becomes worn, another track may be used. Further, laps having numerous tracks of different sizes, such as tracks 105 and 110 of lap 100, may be used in a greater variety of SPMs having different ranges of motion. This will be discussed in further detail below. Further yet, fabricating a lap having multiple tracks does not introduce significant manufacturing costs above and beyond a lap having a single track. This also will be discussed in further detail below.

Laps 100, 400, and 500 (FIGS. 1, 4, and 5) each have two tracks that are similarly shaped. However, the present invention provides laps having tracks of different shapes. For example, a lap may have a square track nested in or alongside an elliptical track. Providing tracks with different shapes provides a larger number of shapes that can be imparted onto a workpiece than a lap having tracks of a single shape.

Figure 6A:
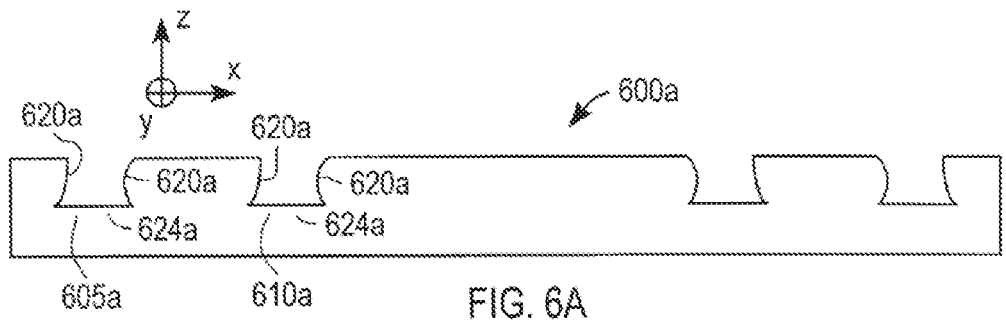
FIGS. 6A and 6B are cross-sectional views of two laps, each having tracks with curved sidewalls and a relatively flat bottom surface.
Figure 6B:
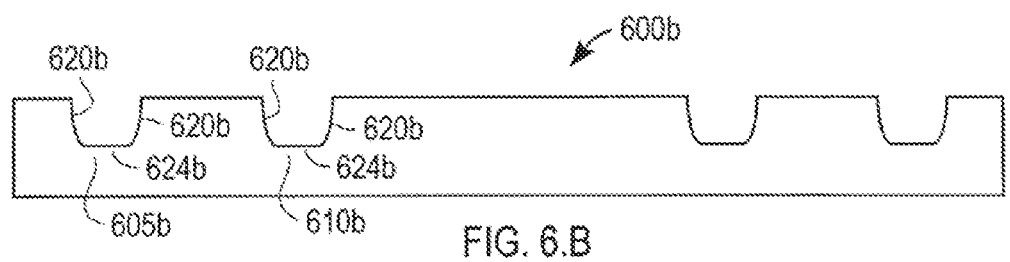

FIGS. 6A and 6B are cross-sectional views of laps 600a and 600b, respectively, according to embodiments of the present invention. Lap 600a has tracks 605a and 610a, each with convex sidewalls 620a and relatively flat bottom surfaces 624a. Lap 600b has tracks 605b and 610b each with concave sidewalls 620b and relatively flat bottom surfaces 624b. The laps described above have tracks with relatively flat bottom surfaces, however, laps of the present invention are not limited to having relatively flat bottoms.

Figure 6C:
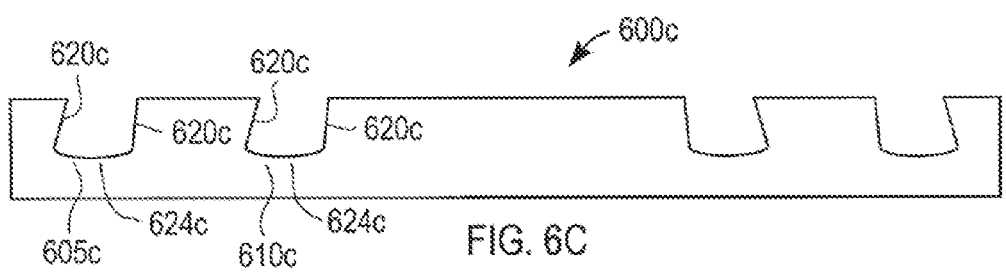
FIGS. 6C and 6D are cross-sectional views of two laps, each having tracks with sidewalls that are relatively flat with bottom surfaces that are curved.
Figure 6D:
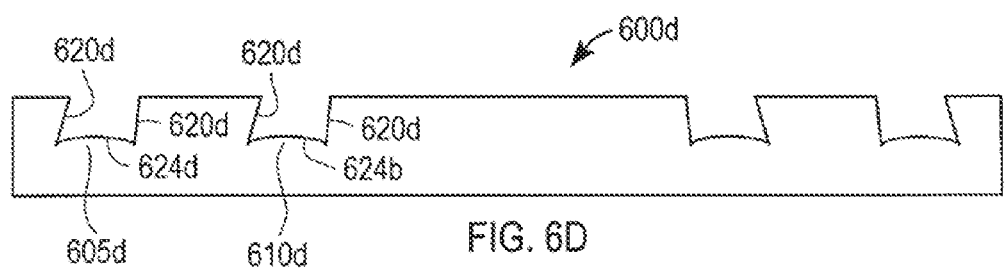

FIG. 6C and FIG. 6D are cross-sectional views of laps 600c and 600d, respectively, according to embodiments of the present invention. Lap 600c has tracks 605c and 610c, each with relatively flat sidewalls 620c and concave bottom surfaces 624c. Lap 600d has tracks 605d and 610d each with relatively flat sidewalls 620d and convex bottom surfaces 624d.

Figure 6E:
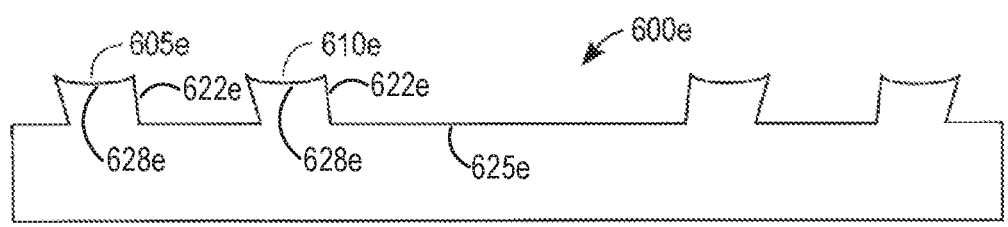
FIG. 6E is a cross-sectional view of a lap having tracks each having a top surface that is curved.

FIG. 6E shows a cross-sectional view of a lap 600e according to an embodiment of the present invention. Lap 600e has tracks 605e and 610e each protruding above top surface 625e. The top surfaces 628e of each of the tracks 605e and 610e have concave surfaces. The sidewalls 622e are relatively flat.

While a top view of laps 600a-600e is not shown, the profiles of the tracks from a top view, may include any of the profiles discussed above, such as polygonal, round, or combinations thereof. Each of the tracks 605a-605e and 610a-610e are shown to have relatively flat surface portions and curved surface portions, but it should be understood, the tracks may have all curved surface portions, or other combinations of curved and straight surface portions.

Embodiments with Polygonal and Curved Surface Portions

FIGS. 7A and 7B are schematic side and perspective views, respectively, of a lap 700 according to an embodiment of the invention. Lap 700 is a right solid. In other words, the various surface portions of the lap meet at right angles. Each of sidewalls 710, 712, 714, and 716 is perpendicular to top surface 720 and bottom surface 722 and perpendicular to its adjacent sidewalls. All surface portions of lap 700 may be portions of a lapping surface or selected surface portions may be portions of a lapping surface. For example, sidewalls 710, 712, 714, and 716 may collectively constitute a lapping surface or the sidewalls and the top surface may constitute a lapping surface.

Typically, the heights of the sidewalls are set according to a given lapping process to be achieved, for example, the height of the sidewalls may be in the range of about 200 µm to about 0.25 µm. According to a specific embodiment the sidewall heights are about 17 µm. However, according to other embodiments, the sidewall heights may be larger, for example greater than about 200 µm for nanolapping relatively larger workpieces. A workpiece may be shaped by lap 700 either by rubbing the workpiece in an up-and-down motion along a sidewall or side-to-side along a sidewall. Rubbing the workpiece against a sidewall of the lap transfers the profile of the lap to the workpiece. The top and bottom surfaces may also be a lapping surface. A workpiece lapped along a sidewall and say the top surface of the lap will assume not only the sidewall profile but will also assume the profile of the top surface and the edge joining these lapping surface portions.

As previously discussed, the sidewalls of lap 700 are perpendicular to top and bottom surfaces 720 and 722, respectively, and to adjacent sidewalls, but it should be understood that laps according to the present invention may have other useful geometries. For example, the interior angles 740, 742, 744, and 746 of top surface 720 may be a variety of angles other than 90°. According to embodiments of the present invention, the interior angles may range from acute angles of about 1° or less to angles approaching 180°. For example, according to a specific embodiment of the present invention, angles 740 and 744 are each about 60° and angles 742 and 746 are each about 120°.

FIGS. 8A, 8B, and 8C are schematic side, perspective, and top views, respectively, of a lap 800 according to another embodiment of the present invention. The surface portions of lap 800 include four sidewalls 810, 812, 814, 816, top surface 820, and bottom surface 822. Each of the sidewalls and/or top surface and/or bottom surface may be a portion of the lap's lapping surface. The sidewalls are each beveled with respect to their adjacent sidewalls. Each sidewall is also beveled with respect to the top and bottom surfaces. According to embodiments of the present invention, the sidewall height (i.e., distance between the top and bottom surfaces) may be from about 200 µm to about 0.25 µm. According to a specific embodiment of the invention, the sidewall height is about 17 µm. Each of the interior angles 840, 842, 844, and 846 of the top surface is set according to a lapping result to be achieved. According to embodiments of the present invention, the interior angles may range from acute angles of about 1° or less to obtuse angles approaching 180°. According to a specific embodiment of the present invention, angles 840 and 844 are each about 60° and angles 842 and 846 are each about 120°.

The relative lapping motion between a workpiece and a lapping surface may be in the up-and-down direction (indicated by double-headed arrow 870) along sidewalls 810, 812, 814, and 816, or may be side-to-side (indicated by double-headed arrow 872) along the sidewall and/or top and/or bottom surfaces 820 and 822, respectively. Further, lapping motions can be a combination of up-and-down and side-to-side motions. A workpiece rubbed against the sidewall portions of the lap surface will adopt the sidewall profile, for example a beveled lapping surface will produce a bevel on the workpiece. A workpiece rubbed successively along each of the sidewalls of the lap will adopt not only the beveled profile of the sidewalls, but also the polygonal shape of the top and bottom surfaces. A workpiece rubbed against a sidewall and, for example, the top surface of the lap will adopt the shape of the sidewall and top surface. FIG. 8A shows a workpiece 735 having adopted the profile of sidewall 810 and top surface 820.

A workpiece may also be lapped against adjacent sidewalls of lap 800, for example sidewalls 812 and 814. FIG. 8C shows a workpiece 874 having adopted the profile of sidewalls 812 and 814. Successively rubbing sidewall 810 and 812 at radial increments about a center of the workpiece 874 may form, for example, a simple gear shape, as shown in FIG. 8C. A gear shape may be lapped onto various portions of a workpiece, for example, section 760 of workpiece 735 may have a gear shaped lapped thereon.

While laps 700 and 800 are shown to have four sidewalls and a top and bottom surface, other polygonal shaped laps may be of use. For example, according to embodiments of the present invention, laps may have sidewalls and/or top and bottom surfaces of triangular, pentagonal, or other polygonal shapes.

FIG. 9 is a side view of a lap 900 according to another embodiment of the present invention. Lap 900 has a stepped pyramidal surface profile. The surface portions forming the stepped pyramidal feature include, sidewalls 905, 910, 920, 925, and 930 that provide the vertical components of the stepped shape and top surfaces 907, 912, 922, 927, 932 and bottom surface 940 that provide the horizontal components of the stepped shape. Lap 900 provides several surface and edge profiles, for example, acute angle 960, right angle 965, obtuse angle 970, and rounded edge 975. The various lapping surface profiles of lap 900 reduce the number of laps required to build up a complex profile on a workpiece. For example, referring to FIGS. 7A and 8A, workpiece 735 is shown to have profiles imparted from both lap 700 and lap 800. For example, a bottom section 760 of workpiece 735 is shaped by lap 700, while a middle section 762 of the workpiece is shaped by lap 800. However, lap 900 can be used to provide both the bottom and middle profiles by positioning workpiece 735 at various positions with respect to lap 900 during different stages of a lapping operation.

Rotational Laps

Figure 10A:
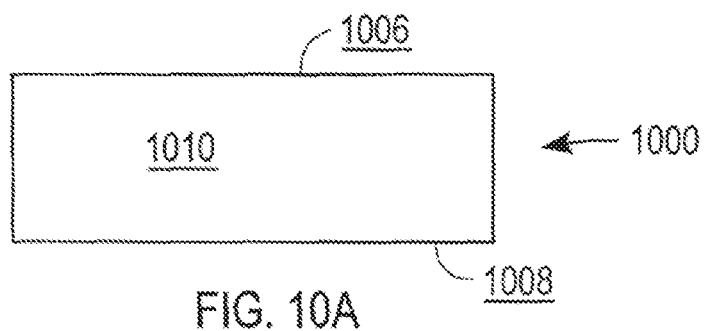
FIGS. 10A, 10B, and 10C are schematic side, perspective, and top views, respectively, of a lap according to an embodiment of the present invention.
Figure 10B:
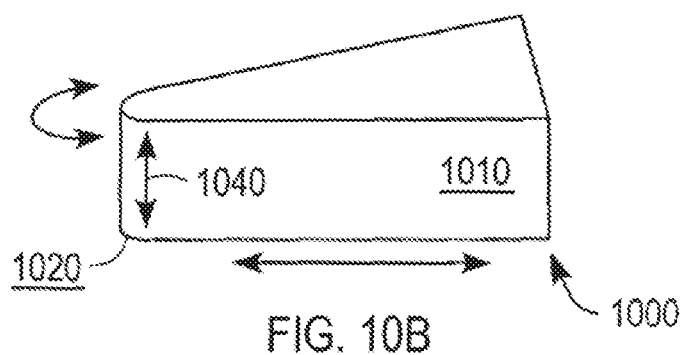
Figure 10C:
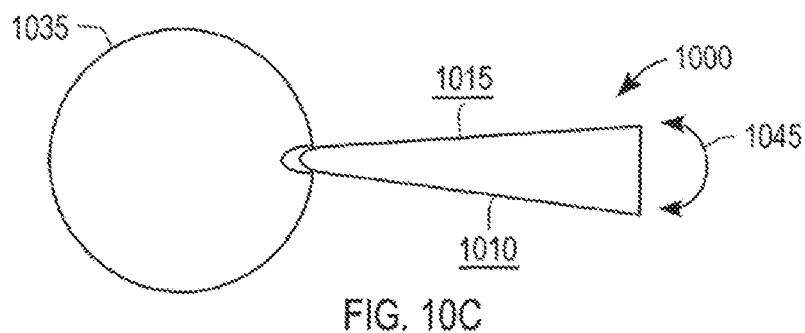
Figure 10D:
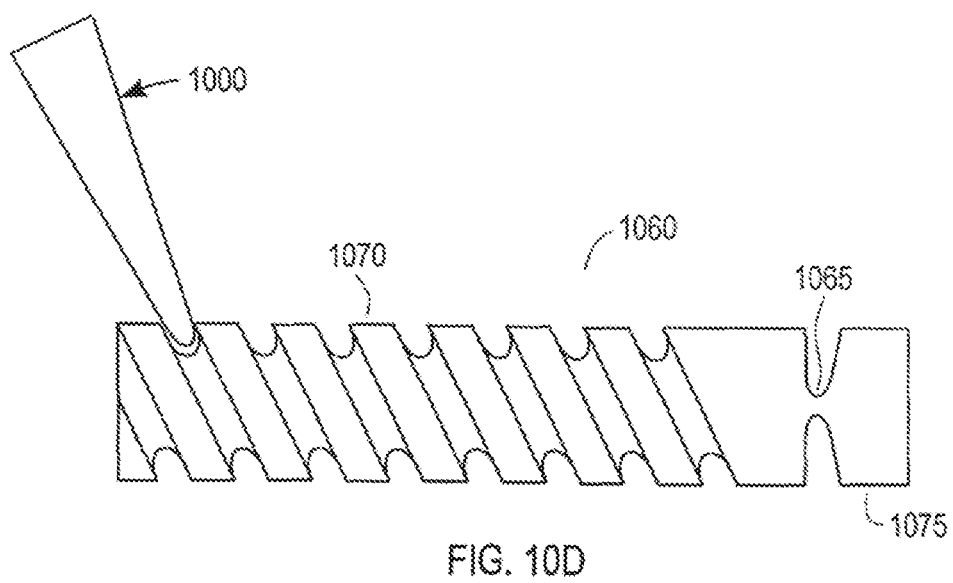
FIG. 10D shows a lap that may be rotationally and transversely moved with respect to a doweled shape workpiece to impart a thread type pattern onto the workpiece.

FIGS. 10A, 10B, and 10C are schematic side, perspective, and top views, respectively, of a lap 1000 according to an embodiment of the present invention. Lap 1000 has top and bottom surfaces 1006 and 1008, and sidewalls 1010 and 1015 joined by a rounded surface 1020. The lapping surface of lap 1000 may include, for example, portions or all of the sidewalls and/or rounded surface and/or top surface and/or bottom surface. Lap 1000 is of use to impart curves or other shapes to a workpiece 1035. For example, a curved surface may be imparted to a workpiece 1035 by moving the workpiece up and down as indicated by the double-headed arrow 1040. Alternatively, a curved shape may be imparted to workpiece 1035 by rotating the lap with respect to the workpiece as indicated by double-headed arrow 1045. Other lapping motions may also be of use, for example, combinations of rotational and up and down motions. For example, lap 1000 may be rotationally and transversely moved with respect to a dowel-shaped workpiece 1060 to impart a thread pattern to the workpiece as shown in FIG. 10D.

FIGS. 11A, 11B, and 11C are schematic side, bottom, and perspective views, respectively, of a lap 1100 according to an embodiment of the present invention. Lap 1100 has a cylindrical shape that includes a sidewall 1110 and a bottom surface 1115. As shown, the sidewall and bottom surfaces are perpendicular to each other. Lap 1100 is deployable in a variety of ways to give shape to a workpiece. FIG. 11C shows a number of techniques for shaping a workpiece 1135 with lap 1100. For example, the right portion of FIG. 11C shows lap 1100 to have a rotational degree of motion as indicated by dashed arrow 1140. Bottom surface 1115, while in rotational lapping contact with workpiece 1135 will lap a circular recess in the surface of the workpiece. Slowly lowering the lap into the recess will further deepen the recess resulting in a hole, indicated by dashed lines 1160.

Sidewall 1110 may also be used to lap a workpiece. For example, the left side of FIG. 11C shows sidewall 1110 in lapping contact with sidewall 1170. In such a configuration, the lap may be variously manipulated to lap the workpiece 1135. For example, the lap may be in rotational contact with the workpiece or the lap may be moved up and down with respect to the workpiece, as indicated by double-headed arrow 1152. Additionally, the lap may be swept side-to-side across sidewall 1170 of the workpiece as indicated by double-headed arrow 1157. Or, the lap may be in lapping contact through a combination of the aforementioned degrees of motion. For example, the lap may be in rotational lapping contact with the workpiece and simultaneously be swept side-to-side across the workpiece. According to an embodiment of the present invention, the diameter of the lap is about 200 μm or less, or is about 50 μm or less, or is about 25 μm or less. According to a specific embodiment of the present invention, the diameter of lap 1100 is about 5 nm.

FIGS. 11D and 11E are side and bottom views, respectively, of a lap 1102 according to another embodiment of the present invention. Lap 1102 has a round sidewall 1105 and a bottom surface 1110. This embodiment differs from the embodiment shown in FIGS. 11A-11C in that the bottom surface 1110 has a curved profile as viewed from the side and has a circular profile as viewed from the bottom. Lap 1102 is deployable in variety of ways to lap a workpiece. For example, lap 1102 may have a rotational degree of freedom about the y-axis as indicated by double-headed arrow 1145. The lap may have a similar rotational degree of freedom about the x-axis. Further, lap 1102 may also be translatable along the z-axis as indicated by double-headed arrow 1150. Rotating lap 1102 about the y-axis and lowering it along the z-axis, while in lapping contact with a workpiece 1135, will produce a curved indentation 1133 into the workpiece. According to embodiments of the present invention, lap 1102 has a diameter of about 200 μm or less. In accordance with various embodiments of the invention the diameter of the cylinder may be on the order of about 100 μm or less, or is about 50 μm or less, or is about 25 μm or less. According to a specific embodiment of the present invention, the diameter of the bottom surface as viewed from the bottom is about 5 nm.

While laps 1100 and 1102 are shown to have flat and curved bottom surfaces, respectively, it should be understood, that the bottom surfaces of these laps may have a variety of shapes, such as conical, frusto conical, hemispherical, and the like. Laps with conical ends are of use, for example, to impart a bevel shape, or v-groove shape to a workpiece. Further, while the sidewalls of laps 1100 and 1102 are shown to be relatively smooth, the sidewalls may have various contoured shapes that protrude from or are recessed into the sidewalls.

Rotational motions previously described may be achieved by use of active cantilevers described in co-owned copending U.S. patent application Ser. No. 10/094,408, entitled "Active Cantilever for Nanomachining and Metrology," now U.S. Pat. No. 6,923,044, incorporated herein by reference in its entirety for all purposes. Active cantilevers of the aforementioned application provide rotational degrees of motion for scanning probe microscope (SPM) tips. Laps previously described may be each be a tip of an SPM (described in detail below) and each may be the tip of an SPM having an active cantilever.

Laps Embodiments Formed from 110 Cut Silicon Wafers

FIGS. 12A and 12B are schematic top and cross-sectional views, respectively, of a lap 1200 made from a silicon wafer cut along the 110 plane according to an embodiment of the present invention. Lap 1200 has a single straight track 1205 formed as a recess in the wafer having a top surface 1225. Track 1205 is shown to have two sidewalls 1230 and 1232 and a bottom surface 1234. FIG. 12B is a cross-sectional view taken along line 12B-12B of FIG. 12A showing the profile of track 1205. Sidewalls 1230 and 1232 are approximately parallel to a crystal plane of the wafer and are approximately parallel to each other. As the sidewall are approximately aligned with crystal planes of the wafer, the sidewalls are relatively flat (e.g., approximately atomically flat). Further, each sidewall is also approximately perpendicular to top surface 1225 as the crystal plane is approximately perpendicular to the wafer surface.

Track 1205 has similar dimensions as those of lap 100 shown in FIG. 1A. For example, the height of sidewall segments (measured between top surface 1225 and bottom surface 1234) 1230 and 1232 are equal to about 200 μm or less. In accordance with various embodiments of the invention the height of the sidewall segments may be on the order of about 100 μm or less, about 75 μm or less, about 60 μm or less, about 50 μm or less, or about 10 μm or less. According to other embodiments of the present invention, the height of the sidewalls is about 14 μm to 2 μm and the width of bottom surface is about 2 μm to 4 μm.

A workpiece may be lapped along sidewalls 1230 and 1232 to produce a workpiece having two relatively parallel surfaces. Lap 1200 may also be used to produce workpieces with other profiles, such as triangular, square, or other profiles. To lap such shapes, the lap and workpiece are variously positioned. For example, to lap a triangle, lap 1200 is placed in a first position to form a first side of the triangle, then in a second position to form a second side of the triangle, and finally in a third position to form a third side of a triangle. Either the lap or the workpiece or both may be positioned to achieve the desired lapping orientations.

Lap 1200 may also be used to lap curved profiles onto a workpiece. To lap a curved profile onto a workpiece, either the lap or the workpiece are rotated while the lap and workpiece are in lapping contact. For example, to produce circular shaped workpieces, the lap and workpiece may be rotated 360° with respect to each other. To produce curved surfaces, other than circles, the lap or workpiece may be rotated through an angle less than 360°. For example, lap 1200 may be rotated trough 90° to produce a partially rounded surface.

FIG. 13A is a schematic top view of a lap 1300 having a hexagonal track 1305 according to an embodiment of the present invention. Lap 1300 is comprised of six lap segments 1340a-1340f. The six lap segments can be constructed from another lap, for example, lap 1200 shown in FIG. 12A. FIGS. 13B and 13C show top and side views, respectively, of lap 1200 with dashed lines 1352, 1354, 1356, and 1358 indicating location at which lap 1200 may be cut to form segments 1340a-1340f. FIG. 13D shows a single segment 1340a of lap 1300 to be constructed.

As the sidewalls of lap 1200 are approximately parallel to a crystal plane and relatively flat (e.g., approximately atomically flat), so too are the inner and outer sidewalls of lap 1300. Accordingly, lap 1300 laps relatively smoother workpieces than laps having the same hexagonal shape but having surface portions not aligned with crystal planes. For example, a lap having a hexagonal track may be formed from a contiguous silicon wafer cut along the 110 plane. However, the sidewalls forming the hexagonal track will not all align with crystal planes and so the lap will have relatively rougher (i.e., less flat) sidewalls than the sidewalls of lap 1300.

FIGS. 14A and 14B are schematic top and cross-sectional views, respectively, of lap 1400 having a hexagonal track 1405 according to another embodiment of the present invention. This embodiment differs from the embodiment of FIG. 13A in that it has sets of sidewalls that are not parallel.

Hexagonal track 1405 comprises six segments, each having an associated pair of sidewalls, 1430*a*/1432*a*, 1430*b*/1432*b*, 1430*c*/1432*c*, 1430*d*/1432*d*, 1430*e*/1432*e*, and 1430*f*/1432*f*. Each segment of track 1405 shares a common bottom surface 1434. FIG. 14B is a cross-sectional view taken along line 14B-14B of FIG. 14A. The cross-sectional view shows two segments of track 1405: one segments defined by sidewalls 1430*b*, 1432*b* and surface 1434; and another segment define by 1430*e*, 1432*e*, and surface 1434.

Lap 1400 comprises six segments denoted 1440*a*-1440*f*. Each of the six segments is cut from a lap, such as lap 1200 shown in FIG. 12A. FIGS. 14C and 14D show top and side views, respectively, of lap 1200 with dashed lines 1462, 1464, 1466, and 1468 indicating locations at which the lap may be cut to make segments 1440*a*-1440*f*. FIG. 14D show dashed lines 1262, 1264, 1266, and 1268 askew from perpendicular to lap surface 1230.

From a top view, lap 1400 has a profile similar to lap 1300 shown in FIG. 13A. However, unlike lap 1300, track 1405 has sets of sidewalls that are not parallel. The cross-sectional view shown in FIG. 14B shows outer and inner sidewalls 1430*b* and 1432*b* parallel with each other and outer and inner sidewalls 1430*e* and 1432*e* parallel with each other. However, sidewalls 1430*b* and 1432*b* are not parallel with sidewalls 1430*e* and 1432*e*.

Each of laps 1300 and 1400 is a specific embodiment of a lap according to the present invention sharing hexagonal shaped tracks. However, the laps are illustrative of a process by which laps having a variety of shapes may be made. The process of cutting a lap, such as lap 1200, may entail cuts along any angle. The process of cutting a lap and rearranging the segments provides for the creation of laps of various shapes. For example, triangular, quadrilateral, pentagonal, and the like. In general, any arbitrary non-uniform polygonal shape can be made.

Lap Material

According to an embodiment of the present invention, laps are formed from substrates such as wafers. Suitable wafer materials include those that may be shaped by well known semiconductor fabrication techniques. For example, suitable wafers include those in which a lapping track may be formed by wet and/or dry etching techniques. Wet etching includes processes in which a wafer is masked and immersed in a liquid reagent. The reagent chemically removes the unmasked portions of the wafer. Wet etching produces relatively smooth surface portions and is generally of use for surface portions (e.g., track sidewalls) having heights of 3 µm or greater. Surface portions of lesser height tend to be undercut by wet etch processes.

Dry etching includes processes in which a gaseous species is made reactive in a plasma. The reactive gas chemically binds with unmasked portions of a wafer forming a new chemical species, thereafter the resultant chemical species is desorbed from the wafer surface, and hence alters the wafer's surface. Wet etching produces relatively smoother surfaces portions than dry etch techniques. However, dry etch techniques are generally useful for geometries in which wet etch techniques tend to undercut. For example, dry etch is generally useful for producing tracks having sidewall heights less than about 3 µm, e.g., 1-2 µm.

Referring again to FIG. 1B, recessed tracks 105 and 110 may be formed by masking the areas surrounding the area where the tracks are to be formed and etching the track into the wafer. Referring again to FIG. 1C, raised tracks 105' and 110' can be made by a similar yet varied masking technique. The area where tracks are to be formed are masked (instead of the area surrounding the tracks) and the wafer surface is wet or dry etched until the desired track height is revealed. Dry and wet each techniques are a cost effective methods for producing laps having a single track or multiple tracks as each may be produced for relatively insignificant cost differences.

Wafer material suitable for wet and dry etching include, for example, silicon, silicon nitride, silicon dioxide, and various types of glass (i.e., fluorine glass). Those of ordinary skill in the art will recognize other useful material from which laps may be made.

According to an embodiment of the present invention, silicon wafers that are cut along the 100 crystallographic plane are etched to produce laps. Silicon having this orientation is well suited for laps having tracks such as those shown in FIGS. 1A, 4A, and 5A. The tracks in each of these laps can be characterized as having surface portions with a variety of angles with respect to the crystallographic planes of the silicon wafer. Silicon wafers that are cut along the 100 crystallographic plane can be etched at these angles while maintaining relatively flat surface portions. To produce a lap having relatively flatter surface portions (e.g., approximately atomically flat) silicon is etched along its crystal planes. For example, for silicon wafers that are cut along the 100 crystallographic plane, one of the crystal planes is oriented approximately 35° from the surface normal of the wafer. Trenches having surface portions approximately parallel to this crystal plane are typically flatter than surface portions askew to the crystal plane.

According to another embodiment of the present invention, silicon wafers cut along the 110 crystallographic plane can be etched to produce laps. Silicon wafers having this crystallographic orientation have crystal planes approximately parallel to the surface normal of the wafer. Accordingly, relatively flat surface portions (e.g., approximately atomically flat) may be etched approximately parallel to the crystal planes. Surface portions etched at angles askew from the crystal planes produce relatively rougher (i.e., less flat) surfaces. Laps having lapping surfaces aligned with a crystal plane impart onto a workpiece relatively smoother surfaces than a workpiece shaped from laps having a lapping surface not aligned with a crystal plane.

According to an embodiment of the present invention, laps may be used in combination to shape a workpiece. A lap having relatively less flat, (i.e., rougher) surface portions are used to roughly shape a workpiece. Laps having relatively flatter surface portions are used to finely shape a workpiece once roughly shaped. According to another embodiment of the present invention, laps having relatively flatter surface portions are used to restore an edge of a worn workpiece.

The above discussion has been primarily of laps formed from silicon wafers; however, other substances may be of use to make laps. For example, carbon based materials may be used to make laps. According to embodiments of the present invention, diamond, diamond like carbon, and various carbides (e.g., titanium carbide) are used to make laps. For example, diamond rods may be used to make laps such as those shown in FIGS. 11A-11E. Those of skill in the art will know of other material suitable from which to construct laps, such as cubic boron nitride and other hard crystals.

Lap Coatings

According to an embodiment of the present invention laps are coated to enhance material removal from a workpiece during nanolapping. Coatings are generally categorized into two groups, abrasive and chemical. Abrasive coatings mechanically remove material from a workpiece and generally do not chemically react with the removed material.

Chemical coatings react with the surface of a workpiece thereby removing material from the surface.

According to an embodiment of the present invention, diamond like carbon (DLC) is coated onto a lap. Diamond like carbon is both hard and relatively chemically inert at low temperatures. Coated onto a lap, diamond like carbon forms a relatively fine abrasive.

Diamond like carbon can be coated onto a lap via a vacuum arc process such as plasma enhanced chemical vapor deposition or via ion beam techniques. Those of skill in the art will know other useful coating processes for DLC. Coating thickness of DLC vary from about 70 nanometers to about 100 nanometers. Selected surfaces of a lap may be coated with DLC or all of the surfaces may be coated. For example, tracks formed in a wafer may be coated while other masked portions, for example a top surface, of the lap are not coated.

According to another embodiment of the present invention, diamond is coated onto laps. Diamond can be grown on a DLC layer. Diamond coatings vary from about 70 nanometers to about 100 nanometers to about 5 μm. Diamond coated onto a lap forms a relatively fine abrasive, although the coating is generally more course than DLC.

The discussion above provides examples of two coatings, DLC and diamond, that may be coated onto a lap to create an abrasive surface. However, numerous other substances may be coated onto a lap to create the abrasive surface. For example, cubic boron nitride is a relatively hard substance that may be used as an abrasive coating. Other examples of useful abrasive coatings include various types of carbides, (e.g., titanium carbide). Those of skill in the art will know of other useful substances that can be coated onto a lap to form an ordinary abrasive surface.

According to an embodiment of the present invention, chemically reactive coatings are deposited on a lap's surfaces. Chemically reactive coatings include those chemically bonding to the atoms of a workpiece and thereafter removing the atoms from the workpiece. According to one embodiment of the present invention, aggressive carbide formers can be coated onto laps. Aggressive carbide formers chemically react with workpieces having carbon, (i.e., diamond). Aggressive carbide formers include, for example, iron, nickel, chromium, iron, titanium, manganese, tungsten, and the like. Each of these elements has an affinity for carbon and form stable carbon compounds when rubbed against a workpiece having carbon. Aggressive carbide formers are of use for lapping, for example, workpieces made of diamond, carbide, and diamond like carbon.

Aggressive carbide formers more readily bond with carbon at elevated temperatures than at relatively lower temperatures. However, if temperatures are excessively high, a lap and workpiece will gall each other. The temperature point at which two surfaces gall each other is often referred to as the flash temperature. According to an embodiment of the present invention, chemical lapping can be performed below the flash temperature. According to a further embodiment of the present invention, chemical lapping can be performed in a temperature range from about 200° C. to about 300° C.

Scanning Probe Microscope Tips and Substrates

According to an embodiment of the present invention, the previously described laps, are used in conjunction with a scanning probe microscope (SPM) to give shape to a workpiece. An SPM typically operates by sweeping a tip in a raster pattern across the surface of a substrate. As the tip is swept across the substrate, various microscopy techniques may be used to generate an image of the surface of the substrate. Examples of SPM techniques include, scanning electron microscopy, scanning tunneling microscopy, atomic force microscopy, and the like.

According to an embodiment of the present invention, a lap may be an SPM tip or may be a substrate. The workpiece to be shaped may also be an SPM tip or a substrate. For example, a substrate that serves as a lap may be placed under an SPM tip. In such a configuration, the SPM tip is the workpiece to be shaped. In an alternative configuration the lap may be the SPM tip and placed over the workpiece. In such a configuration, the substrate is the workpiece to be shaped. An SPM tip that changes the structure of a substrate is often referred to as a "tool," "tool tip," or "toolpiece" while the term "tip" is often used in reference to imaging. However, for convenience sake, tips, tools, tool tips, and toolpieces will both be referred to as "SPM tips" or simply "tips."

In a typical SPM, stacked sets of piezoelectrics control the movement the substrate and/or tip. Typically, a separate stacked set of piezoelectrics control motion along each of the Cartesian axes. For example, one stacked set of piezoelectrics may control motion of a tip or substrate along an SPM's x-axis, a second set of stacked piezoelectrics may control motion of a tip or substrate along an SPM's y-axis, and a third set of piezoelectrics may control motion of a tip or substrate along an SPM's z-axis.

The range of motion of a typical SPM tip is about 200 μm to less than one angstrom along each of the Cartesian axes. More generally stated, for a typical SPM, a substrate and an SPM tip can be moved relative to each other by about 200 μm to less than about one angstrom, along the SPM's x, y, and z-axes. Some SPMs have maximum ranges of motion less than 200 μm, with typical maximum ranges being about 100 μm, 75 μm, 50 μm, 25 μm, and 10 μm. According to an embodiment of the present invention, lap dimensions are made to accommodate the typical ranges of motion of an SPM tip. For example, referring to FIG. 1A, the width of octagon track 105 along a widest lateral dimension (width D) or narrowest lateral dimension (width C), can be 100 μm or less, or about 75 μm or less, or about 60 μm or less, or about 50 μm or less, or about 25 μm or less, or about 10 μm or less. According to other embodiments of the present invention, the width of square track 405A of lap 400 (shown in FIG. 4A) between opposite corners (width B) or between opposite surfaces (width C), can be about 100 μm or less, or about 75 μm or less, or about 60 μm or less, or about 50 μm or less, or about 25 μm or less, or about 10 μm or less. According to still other embodiments of the present invention, the broadest expanse (width B) or narrowest expanse (width C) of elliptical track 505 of lap 500 (shown in FIG. 5A) can be about 100 μm or less, or about 75 μm or less, or about 60 μm or less, or about 50 μm or less, or about 25 μm or less, or about 10 μm or less. Laps shown in FIGS. 13A and 14A have similar dimensions.

As discussed above, piezoelectrics provide very fine control of the range of motion of an SPM tip with respect to a substrate. For example, tip control may be less than about one angstrom. This fine control provides for removal of material from a workpiece during a single lapping stroke of as little as one atom or molecular species, and as little as one layer of atoms or species from a workpiece. Accordingly, the present invention provides for the production workpieces having approximately atomic level precision. For example, a workpiece to be formed into a knife edge may be sharpened to approximately an atomic-scale sharpness.

Nanolapping Methods

Laps may have defects along various portions of a surface. Defects may include, for example, pits, bumps, undercuts, and the like. Pits or bumps may form, for example, in a silicon substrate during the etching process. Surface portions that align along planes other than crystal planes more readily form pits and bumps than surface portions aligning with the crystal planes. Additionally, defects tend to form along inside corners more frequently than along other lap features. According to an embodiment of the present invention, during a lapping process, a workpiece is disengaged from a lapping surface near corners and defects, and the workpiece is reengaged with the lapping surface once the workpiece is moved beyond the corner or defect.

Figure 15:
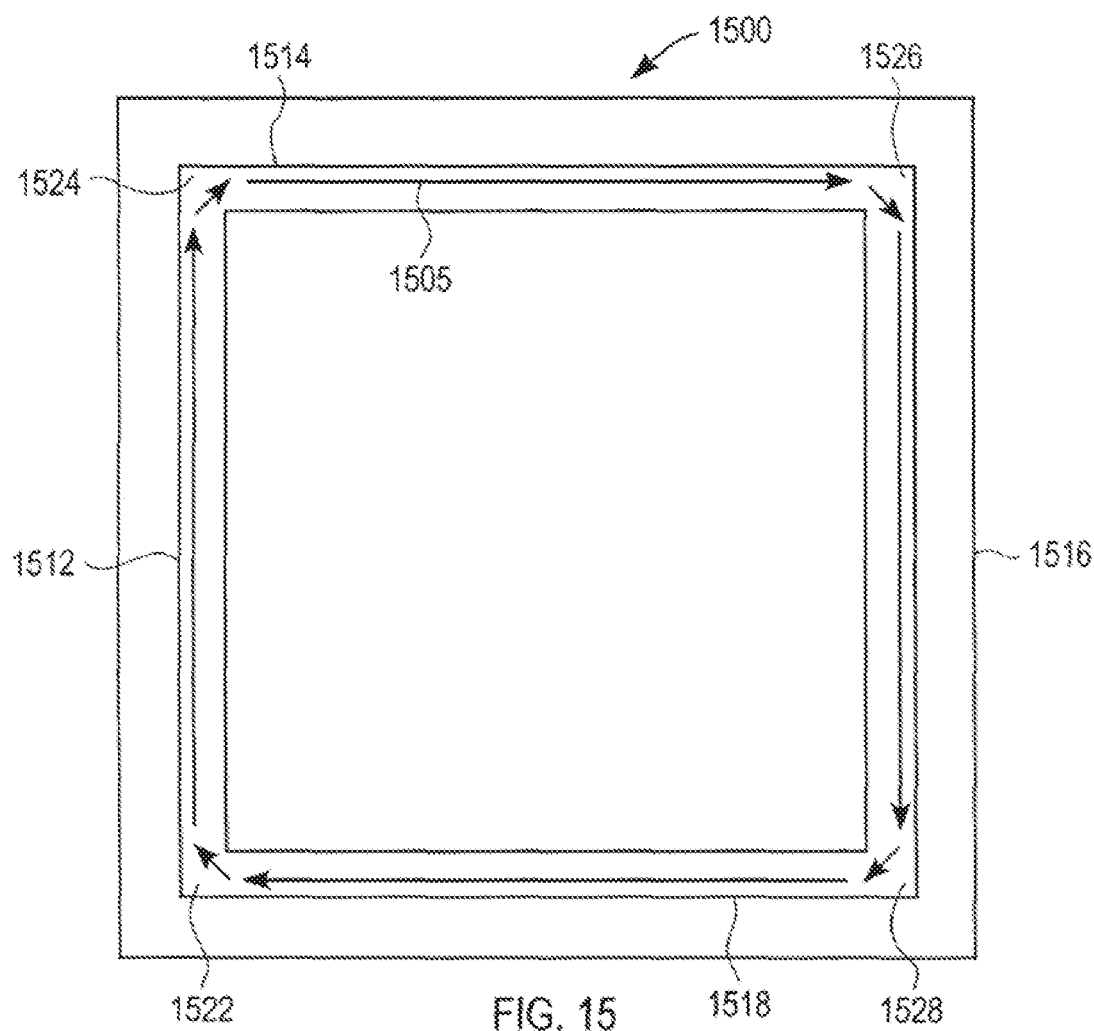
FIG. 15 shows a nanolapping path of a workpiece around a square lap according to an embodiment of the present invention.

FIG. 15 shows a lapping path 1505 around a square lap 1500 according to an embodiment of the present invention. As shown, lapping path 1505 indicates that a workpiece (not shown) is disengaged from the sidewalls 1512, 1514, 1516, and 1518 in the proximity of the corners 1522, 1524, 1526, and 1528. A workpiece disengaged at a corner, is translated around the corner, and is then reengaged with the sidewalls beyond the corner. Accordingly, the workpiece is not affected by any possible defect existing in the corners. This method is not limited to square laps, but may be applied to other laps having corners.

Figure 16:
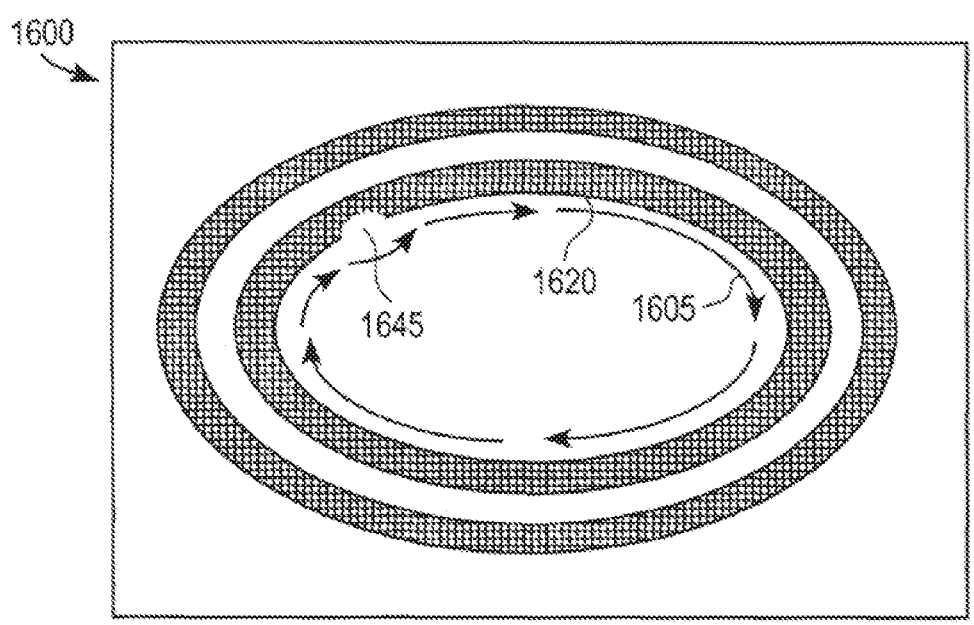
FIG. 16 shows a nanolapping path of a workpiece around a defect in the edge of a lap according to an embodiment of the present invention.

FIG. 16 shows a lapping path 1605 around a defect 1645 occurring in the sidewall 1620 of a lap 1600 according to an embodiment of the present invention. As shown, lapping path 1605 indicates that a workpiece will be disengaged from sidewall 1620 in the proximity of the defect, and translated around the defect. The workpiece reengages with the sidewall beyond the defect. This aspect of the invention ensures that a workpiece is not affected by lap defects during a lapping process.

Workpiece Location and Placement

Of significance in lapping relatively small workpieces (e.g., about 100 µm or less) is knowing the location of the workpiece once made and placing the workpiece in a desired location. Workpieces of such small scale once lost are difficult to find. If a workpiece is chipped off during a lapping process, Brownian motion may keep the workpiece aloft and carry it away to locations where the workpiece may be difficult to find. Even if a workpiece is in a known location, picking the object up and moving it to another known location can also be difficult. According to a lapping method of the present invention a workpiece is lapped to have known fracture zones. For example, FIG. 10D shows a threaded workpiece 1060 having a known fracture zone 1065. Fracture zone 1065 is located between threaded portion 1070 and stock portion 1075. The threaded section coupled to the stock section may be positioned by SPM controls to a known location and separated from the stock along the fracture zone once positioned.

Various techniques may be deployed to separate the threaded portion from the stock portion at the fracture zone. For example, the workpiece may be subjected to a torque causing the fracture zone to mechanically fail. Alternatively, the fracture zone may be heated causing it to mechanically fail or mechanically weaken due to local thermal expansion. Weakening the fracture zone provides that a relatively lower torque may be applied to the workpiece to separate the threaded portion from the stock portion. According to another alternative, the fracture zone may be heated in the presence of a chemical reagent that etches more vigorously the relatively warmer than cooler portions of the workpiece (e.g., diamond workpiece in oxygen) thus etching through the fracture zone.

The fracture zone may be heated by various techniques, for example a low frequency current can be passed through a conductive workpiece (e.g., boron doped diamond, P or N doped silicon, all metals) to heat the fracture zone. Low frequency current heats the portions of the workpiece having the highest resistance, i.e., portion of the workpiece with the smallest cross section (e.g., fracture zone). Alternatively, a high frequency current may be passed through a workpiece heating the fracture zone. High frequency current tends to travel across surfaces heating portions of the workpiece having the smallest surface area (e.g., fracture zone). According to another alternative, the fracture zone may be shaped such that heat passed through the workpiece builds up in fracture zone causing the fracture zone to be relatively warmer than other portions of the workpiece.

A chemical reagent can similarly be applied to a workpiece having an approximately uniform temperature such that the fracture zone is etched through prior to other portions of the workpiece. Subsequent to the fracture zone being etched through, the workpiece may be washed or the chemical reagent neutralized.

Nanomeasurements

Having produced the micron- and submicron-scaled shapes in accordance with the various lapping techniques discussed above, it might be desirable to confirm certain features of the shape by making a series of nanomeasurements. More generally, it might be desirable to be able to verify micron- and submicron-scaled structures regardless of how they were made. For example, it might be desirable to confirm that a given shape has certain dimensional features. It might be desirable to make nanomeasurements during the lapping process to gauge the progress of the lap. The measurements might be useful in providing feedback to inform the nanolapping process in order that appropriate adjustments can be made as needed.

Figure 17:
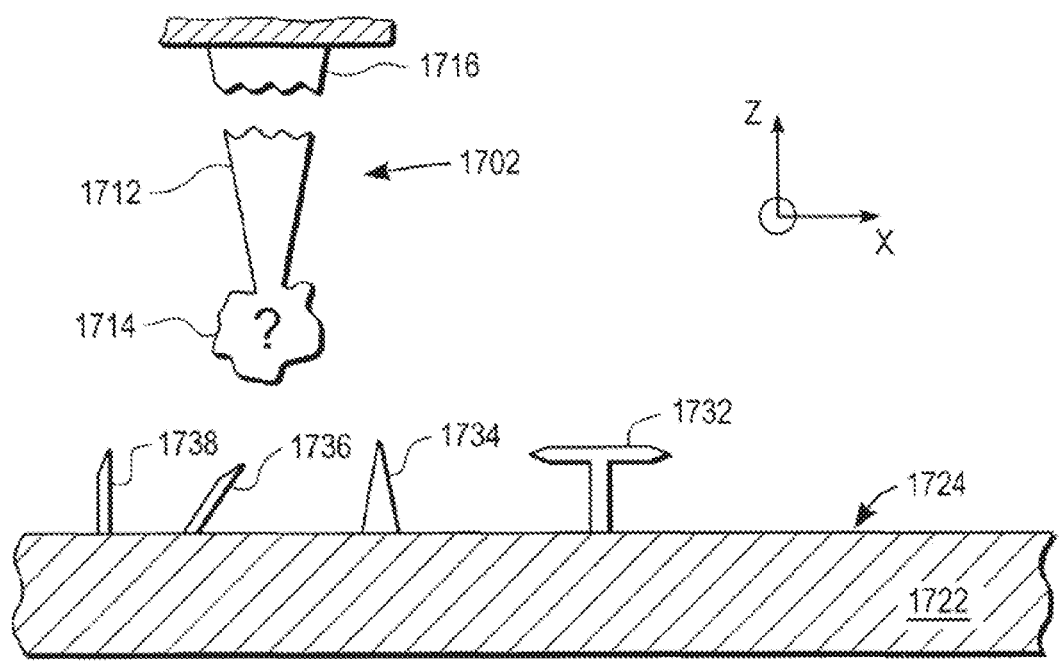
FIG. 17 is a gross-scale cross-sectional side view of a workpiece and a reference surface.

FIG. 17 shows a highly schematized representation of a workpiece 1702 having an arbitrary shape 1714 formed thereon. The shape 1714 can be produced by the nanolapping techniques discussed above. Typically, a nanolapping operation is performed to produce a shape having a predetermined form. However, the actual shape may not always be known; breakage may occur during the nanolap, or unexpected material behavior may cause unpredictable lapping. Consequently, specific features of shape 1714, while having a generally known (expected) shape, will not always be known with certainty.

According to an embodiment of the invention, the shape, as shown in FIG. 17, is formed such that it is disposed at a free end of a segment 1712 of the workpiece 1702, the workpiece having a fixed end 1716. This arrangement facilitates utilizing the workpiece 1702 as a scanning probe, where the segment 1712 serves as a cantilever and the shape 1714 being the scanning tip of the probe. This tip will be referred to as an "unknown scanning tip," since the specific structure of the shape is not known, though it has an expected shape. As will be discussed below, the nanomeasurement technique of this aspect of the invention can reveal specific structural features of the unknown scanning tip.

FIG. 17 further shows a cross-sectional view of a substrate 1722 having a reference surface 1724. A plurality of reference structures 1732-1738 formed on the reference surface are shown in cross-section. The reference structures shown are merely typical examples provided for illustrative purposes. For example, the structure 1732 is a mushroom-shaped structure having a T-shaped cross-sectional view. Structure 1734 is a cone-shaped structure. Structures 1736 and 1738 are knife-edge structures. A first knife-edge 1736 is shown disposed at an arbitrary angle. A second knife-edge 1738 is shown disposed in perpendicular relation to the reference surface 1724. As will become clear, any arbitrarily shaped reference structure can be suitable for purposes of making nanomeasurements.

Figure 18:
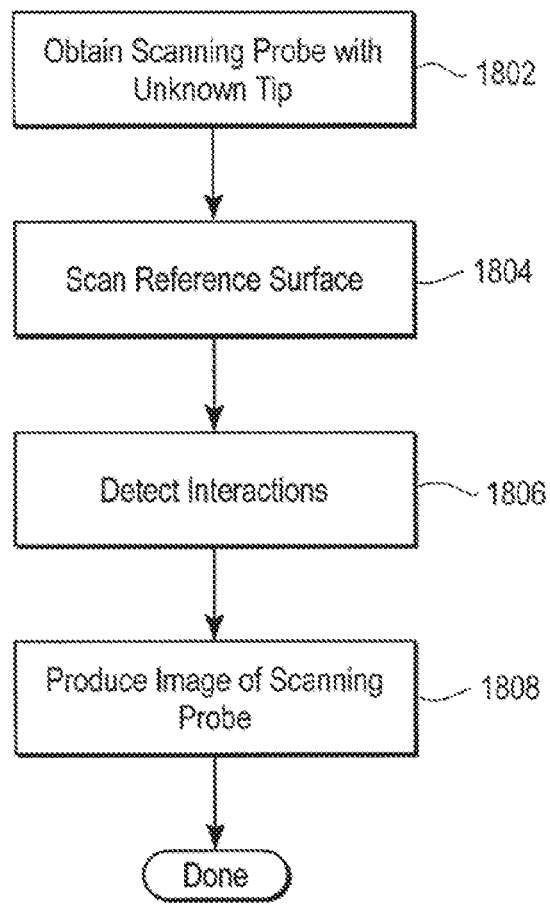
FIG. 18 is a flow chart highlighting the steps for nanomeasurements in accordance with an embodiment of the present invention.
Figure 19A:
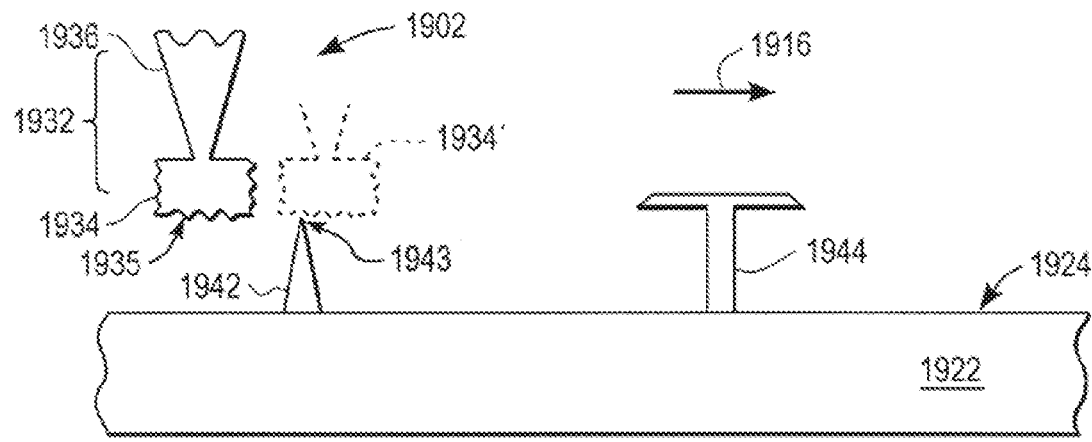
FIGS. 19A and 19B are side views of a workpiece and a reference surface.
Figure 19B:
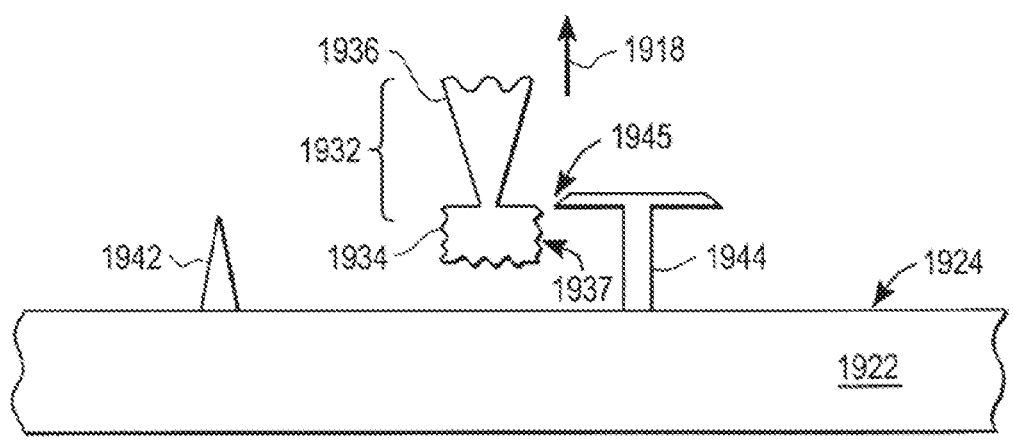

FIG. 18 is a high level flow chart illustrating the process of making nanomeasurements according to embodiments of the invention. FIGS. 19A and 19B are sequence diagrams illustrating generally the scanning sequence. Thus, referring to FIGS. 18 and 19A, a workpiece 1902 having a shape formed thereon, which features are only approximately known, is obtained in a step 1802. As mentioned above, the workpiece can be the product of a nanolap operation performed in accordance with the invention, or can be obtained in other ways. The workpiece 1902 is utilized as scanning probe 1932 which has a generally unknown scanning tip 1934 disposed at a free end of a cantilever 1936. The tip is "unknown" in that its specific surface features are only approximately known.

Next, in a step 1804, the scanning probe 1932 is scanned across a reference surface 1924 having one or more reference structures 1942, 1944 formed thereon. As can be seen in FIG. 19A, the scan proceeds in the direction indicated by the arrow 1916. Due to the atomic forces between the unknown scanning tip 1934 and the reference tip 1943, interactions arise as the tips pass each other. In one embodiment of the invention, the scanning is an AFM-type scan (atomic force microscopy), where the interactions manifest themselves as deflections of the cantilever 1936, scanning probe 1932, or scanning tip 1934. The scanning can be contact mode scanning or non-contact mode scanning. In another embodiment of the invention, the scanning is an STM-type scan (scanning tunneling microscopy), where the interactions manifest themselves as fluctuations in a tunneling current between the unknown scanning tip 1934 and the reference tip 1943.

In a step 1806, the interaction is detected to produce scan data during the scan. In the case of an AFM scan, the deflections of the cantilever can be detected optically, electrically (e.g., with piezoelectric materials), or by other conventional and known techniques to produce deflection signals indicative of the amount of cantilever deflection. Similarly, tunneling current fluctuations in an STM scan can be detected by known techniques to produce data indicative of changes in the magnitude of the tunneling current which occur during the scan.

FIG. 19A illustrates that scanning across the reference structure 1942 will produce signals indicative of the interaction between the reference tip 1943 and a bottom surface 1935 of the scanning tip 1934, as the scanning tip is scanned to a position indicated in phantom 1934'. Incidentally, it is noted that the relative motion between the scanning probe 1932 and the reference surface 1924 can be achieved in various known ways. The scanning probe can be moved about while keeping the substrate 1922 stationery. The scanning probe can be kept stationery and the substrate translated to effect scanning. Both the scanning probe and the substrate can be translated in a coordinated effort to effect scanning.

FIG. 19B shows the unknown scanning tip 1934 having been moved proximate another reference structure 1944. The reference structure 1944 is configured to permit detecting a side surface 1937 of the unknown scanning tip when the scanning probe 1932 is translated in the direction indicated by the arrow 1918. Here, a reference tip 1945 on the reference structure 1944 interacts with the side surface 1937 to produce signals indicative of the interaction when the scanning tip 1934 is scanned along the indicated direction.

In a step 1808, an image or other information relating to the unknown scanning tip 1934 can be produced from the scan signals collected in step 1806. In a conventional scan, the scanning tip has known dimensional features, and the surface has unknown features. The image produced from the scan data using the conventional data processing techniques reveals the unknown surface features. In accordance with the embodiments of the present invention, the same data processing techniques can be applied by combining the collected scan data with "known" (predetermined) data about the surface features of the reference surface 1924 to produce information (typically an image) relating to the unknown scanning tip 1934.

As is well known in the art and in practice, using known reference standards it is possible to determine the shape, curvature, and dimensions of the tip/workpiece by convolution with known shapes, points and/or edges over which the tip/workpiece is scanned. This makes the tip/workpiece convolve with the surface or reference structure which produces the z signal (at a given scanned x,y position) which is the data point. Not unlike the action of an optical lens to create the 2D Fourier Transform of the object on which the lens is focused, the convolution is a property of the physics of the arrangement in an SPM.

In accordance to an embodiment of the invention, the nanomeasure takes measurements with respect to a known reference shape, point and/or edge of specific elements of the nanotool to determine if the target measure has been obtained. This is similar to a machinist making a measure of a shaft being turned on a conventional macro lathe into a target cylinder of target diameter. The machinist merely measures one (or more) diameters along the developing cylinder in order to guide his next cut. The nanolap system uses similar checks in one or more dimensions of the stock part and/or tip/workpiece.

Figure 20:
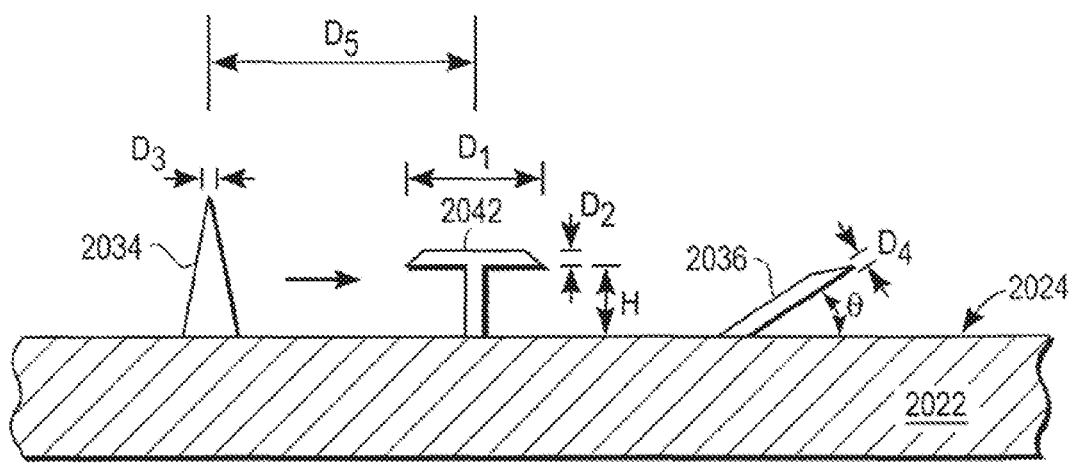
FIG. 20 is a side view of a reference surface illustrating a sampling of reference structures.

FIG. 20 shows reference structures 2034, 2036, and 2042 which are merely examples used to illustrate the kinds of surface features comprising a reference surface 2024. The known surface features comprise predetermined structures having preset features of known dimensions. Thus, for example, consider the mushroom-shaped structure 2042. If such a structure is called for, it can be fabricated or formed with known specific dimensions. Its cap would have a known diameter $D_1$ (typically in units of Å, angstroms) and is spaced apart from the surface 2024 by a distance H. The edge of the cap would have a known shape and a corresponding known edge dimension $D_2$. Similarly, the cone structure 2034 would have known a tip dimension $D_3$, including perhaps the height of the cone, the diameter and so forth. A knife-edge structure 2036, if needed, could be formed with a known tilt angle θ° relative to the reference surface, and possess a specific known edge-shape and edge dimension $D_4$. Also, separation distances $D_5$ between the various reference structures may can be controlled. In sum, the reference surface and its features (e.g., arbitrarily shaped reference structures) can be formed with predetermined shapes having preset measurements.

It can be appreciated from the foregoing that a reference surface having known surface features (i.e., reference structures) can be designed to provide a "reverse imaging" capability to reveal the surface features of an unknown scanning tip. The specific features and structures comprising the reference surface will be driven by the expected shape of the unknown scanning tip. It should be clear that the particular shapes of the reference structures are not limited to the example shapes disclosed herein. Virtually any reference structure of arbitrary shape has the potential of being an appropriate structure, depending on the expected shape of the unknown scanning tip. This aspect of the invention is particularly suited to the disclosed nanolap procedure wherein arbitrary micron and submicron-sized shapes are lapped into a workpiece. Verification of the lapped shape can be made by utilizing the workpiece as a scanning probe where the lapped shape serves as the unknown scanning tip.

Figure 21:
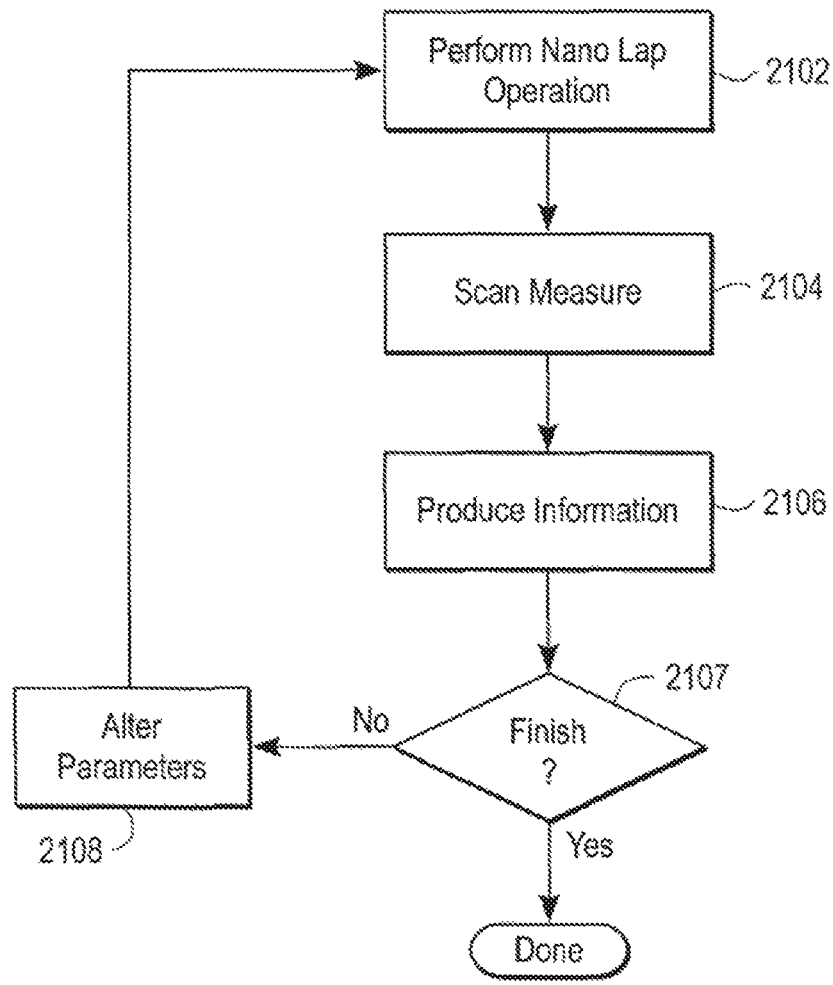
FIG. 21 is a flow chart highlighting feedback processing for nanolapping in accordance with an embodiment of the present invention.

In another embodiment of the invention, the nanomeasurement technique can be used in a feedback loop to guide the nanolapping operation. FIG. 21 shows a high level flow chart illustrating the basic steps of this embodiment of the present invention. In a step 2102, a nanolap operation is performed to lap a shape into a workpiece. The shaped portion of the workpiece can be utilized as an unknown scanning tip to scan a reference surface having various known surface features, in a step 2104. Next, in a step 2106, information collected during the scan is processed to produce information about the shaped portion. The produced information can be used to determine, in a decision step 2107, whether to proceed with another nanolap operation or to terminate the operation. If a decision is made to continue with a subsequent nanolap operation, then in a step 2108, parameters of the nanolap operation can be adjusted based on the produced information. Processing then continues with step 2102, and the cycle repeated until a decision to terminate the processing is made.

Figure 22:
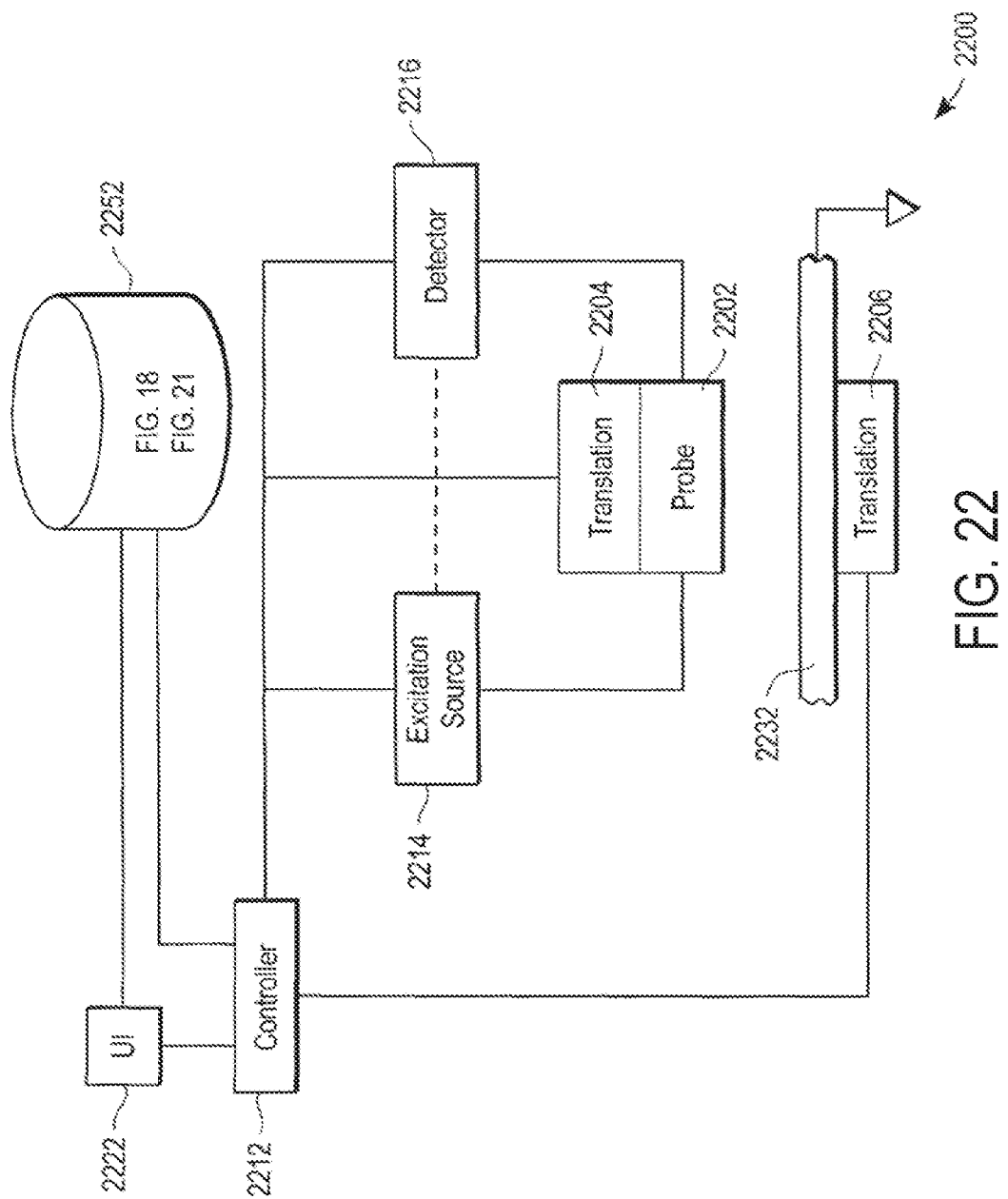
FIG. 22 is a schematic view of a scanning probe microscopy system according to an embodiment of the present invention.

FIG. 22 shows an illustrative embodiment of the present invention by way of a generalized block diagram, illustrating an atomic force microscopy system 2200 that is adopted for nanolapping. An atomic force scanning probe 2202 is the workhorse of the nanolapping system. A typical probe comprises a cantilever and a tip (the lap) disposed at the free end of the cantilever. Various lap shapes and configurations suitable for nanolapping are disclosed above.

The probe 2202 can be coupled to a first translation stage 2204. The first translation stage can provide movement of the probe in the X-Y plane. By convention, the X-Y plane is the plane parallel to the major surface of a workpiece 2232. Thus, the probe can be positioned in the X-Y position relative to the workpiece by the first translation stage. The first translation stage can also provide movement of the probe in the Z-direction and thus position the probe in three-dimensional space relative to the workpiece. Translation stages are known and well understood devices. Typically, they are piezoelectric devices.

Alternatively, a second translation stage 2206 can be provided. The workpiece 2232 can be affixed to the second translation stage to provide X-Y motion of the workpiece relative to the probe 2202. Furthermore, the second translation stage can provide motion of the workpiece in the Z direction relative to the probe.

The relative motion between the probe 2202 and the workpiece 2232 can be achieved by any of a number of techniques. The probe can be translated in three dimensions while maintaining the workpiece in a stationary position. Conversely, the workpiece can move relative to a stationary probe. Both the probe and the workpiece can be moved in a coordinated fashion to achieve rapid positioning. The first translation stage 2204 might provide only X-Y motion, while Z-axis positioning is provided by the second translation stage 2206; or vice-versa. These and still other combinations of concerted motions of the probe and the workpiece can be performed to effect relative motion between the probe and the workpiece.

The nanolapping system has two configurations: (1) The system can be configured to perform nanolapping, wherein the scanning probe 2202 is equipped with a scanning tip configured as a lap and a shape is lapped into the workpiece 2232 in the various ways discussed above. (2) The system can be configured for nanomeasurements, wherein the workpiece is now the scanning probe. The shape that was lapped into the workpiece is the scanning tip, albeit an "unknown" scanning tip. A substrate (e.g., see FIG. 17) having a reference surface 1724 with known features such as reference structures 1732, 1734, 1736, and 1738 is scanned by the unknown scanning tip in the manner discussed above.

An excitation source 2214 delivers an excitation energy to the probe 2202 to make the probe do work. The excitation energy can be any form of energy suitable to drive the probe. For example, a typical scanning probe used in atomic force microscopy comprises a cantilever formed of a piezoelectric material. The piezoelectric material can be driven by an electrical excitation energy. However, alternative probe architectures might use a bi-metal construction that is driven by thermal energy. Surface acoustic waves (SAW) can also be used as the excitation energy.

A detection module 2216 is coupled to detect atomic interactions between the atoms which constitute the probe tip and the constituent atoms of the surface being scanned. Many detection techniques are known. For example, if the probe is operated in AFM (atomic force microscopy) mode, the cantilever is deflected by the interatomic forces acting between the tip and the surface as the tip is scanned across the surface. The deflections can be measured optically. For piezoelectric cantilevers, the deflections can be measured by measuring changes in the electrical characteristics of the cantilever. Measurement signals indicative of the amount of deflection can be analyzed with known analytical techniques to produce data representative of the atomic scale topography of the surface.

A generalized controller 2212 can be configured to provide various computer-based functions such as controlling the components of the nanolapping system, performing data collection and subsequent analysis, and so on. Typically, the controller is some computer-based device; for example, common architectures are based on a microcontroller, or a general purpose CPU, or even a custom ASIC-based controller.

Appropriate control software is provided to operate the computing components to perform the foregoing functions. For example, control signals coordinate the components of the nanolapping system to effect nanolapping operations disclosed herein. It is understood that the generalized controller functions can be allocated to other system components to meet particular system requirements and constraints for a given implementation. For example, data analysis functionality can easily be off-loaded to another computer. The nanolapping system 2200 can have a network connection to a larger system. It is well within the capability of persons of ordinary skill in the relevant arts to produce the appropriate programming code needed to perform the control sequencing and delivery of control signals to coordinate the various components of the nanolapping system 2200 to effect the processing discussed below.

A user interface 2222 is provided to allow a user to interact with the system. The "user" can be a machine user. A machine interface might be appropriate in an automated environment where control decisions are provided by a machine.

A data store 2252 contains various information to facilitate nanolapping operations and for overall operation of the nanolapping system. The data store contains the programming code that executes on the controller 2212, described in the flow charts of FIGS. 18 and 21. Other kinds of information include parameters for setting up the nanolapping system to perform a nanolapping operation. The data store shown in the figure can be any appropriate data storage technology, from a single disk drive unit to a distributed data storage system.

CONCLUSION

While the above is a thorough description of specific embodiments of the invention, various modifications, alternative constructions, and equivalents may be used. For example, laps may be made from quartz or other hard crystalline substances. Further, laps may be of use not only to shape workpieces but may be used to reshape a previously shaped workpiece, or a workpiece that is worn from use. For example, a finely sharpened knife made from, say diamond, by a lapping process, may be resharpened by nanolapping, once the knife has been dulled from use. Therefore, the above description should not be taken as limiting the scope of the invention as defined by the following claims.

What is claimed is:

1. A lapping system for lapping portions of a workpiece, the system comprising:
   a lap defined by a surface, wherein portions of the surface are a lapping surface;
   and wherein the lapping surface has a coating; wherein the coating enhances material removal from a surface of a workpiece in a lapping process; and
   a scanning probe microscope having a tip and a substrate;
   wherein the scanning probe microscope controls lapping motion of the lap relative to the workpiece, wherein the lapping motion provides an abrasive or chemical operation between the coating and the surface of the workpiece that removes material from the surface of the workpiece and imparts a shape to at least a portion of the workpiece, the shape being complementary to the shape of the lapping surface.

2. The lapping system of claim 1 wherein the lap is the tip and the workpiece is the substrate.

3. The lapping system of claim 1 wherein the lap is the substrate and the workpiece is the tip.

4. The lapping system of claim 1 wherein the lap comprises a plurality of lap segments, each lap segment having a segment lapping surface, and wherein the segment lapping surfaces of the plurality of lap segments are oriented to form the lapping surface of the lap.

5. The lapping system of claim 1 wherein the lapping surface of the lap is a track having a polygonal shape, and wherein the track is bounded by a space defined by a cube having edge dimensions of about 200 µm or less.

6. The lapping system of claim 1 wherein the coating of the lapping surface comprises diamond-like carbon (DLC).

7. The lapping system of claim 1 wherein the lap is fabricated from a silicon wafer and the workpiece is made of diamond.

8. The lapping system of claim 1 wherein the coating of the lapping surface comprises diamond-like carbon (DLC).

9. The lapping system of claim 1 wherein the coating of the lapping surface comprises a chemically reactive coating that chemically bonds to atoms of the workpiece.

10. The lapping system of claim 1 wherein the coating of the lapping surface comprises an aggressive carbide former.

11. The lapping system of claim 1 wherein the lapping motion includes rubbing the lapping surface of the lap against the surface of the workpiece.

12. A lapping method for lapping portions of a workpiece, the method comprising:
    providing a lap having a first lapping surface and a second lapping surface, each of the first lapping surface and the second lapping surface having a coating that enhances material removal from a surface of a workpiece in a lapping process;
    controlling movement of the workpiece and the first lapping surface of the lap relative to each other with a scanning probe microscope, thereby lapping a first portion of the workpiece into a first shape complementary to a shape of the first lapping surface;
    controlling movement of the workpiece and the second lapping surface of the lap relative to each other with a scanning probe microscope, thereby lapping a second portion of the workpiece into a second shape complementary to a shape of the second lapping surface;
    wherein lapping the first portion of the workpiece into the first shape includes providing an abrasive or chemical action between the coating of the first lapping surface and the surface of the workpiece that removes material from the surface of the first portion of the workpiece and imparts the first shape to the first portion of the workpiece, the first shape being defined by the first lapping surface; and
    wherein lapping the second portion of the workpiece into the second shape includes providing an abrasive or chemical action between the coating of the second lapping surface and the surface of the workpiece that removes material from the surface of the second portion of the workpiece and imparts the second shape to the second portion of the workpiece, the second shape being defined by the second lapping surface.

13. The method of claim 12 wherein the lap is fabricated from a plurality of pieces of a silicon wafer arranged to form the lap.

14. The method of claim 12 wherein lap comprises a plurality of lap segments, each lap segment having a segment lapping surface, and wherein the segment lapping surfaces of the plurality of lap segments are oriented to form at least one of the first lapping surface or the second lapping surface.

15. The method of claim 12 wherein at least one of the first lapping surface or the second lapping surface is a track having a polygonal shape, and wherein the track is bounded by a space defined by a cube having edge dimensions of about 200 µm or less.

16. The method of claim 12 wherein controlling movement of the workpiece and the first lapping surface relative to each other with a scanning probe microscope includes:
    positioning the lap as a tip of the scanning probe microscope; and
    positioning the workpiece as a substrate for the scanning probe microscope.

17. The method of claim 12 wherein controlling movement of the workpiece and the first lapping surface relative to each other with a scanning probe microscope includes:
    positioning the workpiece as a tip of the scanning probe microscope; and
    positioning the lap as a substrate for the scanning probe microscope.

18. The method of claim 12 wherein the lap is fabricated from a silicon wafer, wherein at least one of the first and second lapping surfaces is coated with diamond-like carbon (DLC), wherein at least the first portion of the workpiece is made of diamond, and wherein during the lapping, the DLC induces removal of diamond from the surface of the first portion of the workpiece.

19. The method of claim 12 wherein at least one of the first and second lapping surfaces is coated with a chemically reactive coating that chemically bonds to atoms of the workpiece.

20. The method of claim 12 wherein the lap is fabricated from a silicon wafer, wherein at least one of the first and second lapping surfaces is coated with an aggressive carbide former, wherein at least the first portion of the workpiece is made of diamond, and wherein during the lapping, the aggressive carbide former induces removal of diamond from the surface of the first portion of the workpiece.

21. The method of claim 12 wherein lapping the first portion of the workpiece into the first shape with the first lapping surface includes rubbing the first lapping surface against the first portion of the workpiece and wherein lapping the second portion of the workpiece into the second shape with the second lapping surface includes rubbing the second lapping surface against the second portion of the workpiece.

* * * * *